(12) United States Patent
Tanaka et al.

(10) Patent No.: US 8,804,248 B2
(45) Date of Patent: Aug. 12, 2014

(54) OPTICAL ELEMENT

(75) Inventors: Kazuhiro Tanaka, Tokyo (JP); Keita Kaifu, Tokyo (JP); Yukihiro Sano, Tokyo (JP); Yukihiro Mitsuda, Gifu (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 13/612,323

(22) Filed: Sep. 12, 2012

(65) Prior Publication Data

US 2013/0010369 A1 Jan. 10, 2013

Related U.S. Application Data

(62) Division of application No. 12/750,827, filed on Mar. 31, 2010, now Pat. No. 8,279,528, which is a division of application No. 12/276,838, filed on Nov. 24, 2008, now Pat. No. 7,813,049.

(30) Foreign Application Priority Data

Nov. 27, 2007 (JP) .................................. 2007-306079

(51) Int. Cl.
*G02B 1/06* (2006.01)
*G02B 3/12* (2006.01)
*G02B 26/00* (2006.01)

(52) U.S. Cl.
CPC .................................. *G02B 26/005* (2013.01)
USPC .......................................... 359/665; 359/666

(58) Field of Classification Search
CPC ....... G02B 26/004; G02B 26/005; G02B 3/12
USPC .................................. 359/665, 666
See application file for complete search history.

(56) References Cited

U.S. PATENT DOCUMENTS

| | | |
|---|---|---|
| 6,369,954 B1 | 4/2002 | Berge et al. |
| 7,576,922 B2 | 8/2009 | Stempel et al. |
| 7,813,049 B2 | 10/2010 | Tanaka et al. |
| 2001/0017985 A1 | 8/2001 | Tsuboi et al. |
| 2003/0206351 A1 | 11/2003 | Kroupenkine |
| 2004/0179259 A1 | 9/2004 | Fujii et al. |
| 2005/0213653 A1 | 9/2005 | Min et al. |
| 2007/0002455 A1* | 1/2007 | Berge et al. .................. 359/665 |
| 2007/0047119 A1 | 3/2007 | Tanaka |
| 2007/0059489 A1 | 3/2007 | Hodes et al. |

(Continued)

FOREIGN PATENT DOCUMENTS

| | | |
|---|---|---|
| EP | 1293807 A | 3/2003 |
| EP | 1798958 A | 6/2007 |

(Continued)

*Primary Examiner* — William Choi
(74) *Attorney, Agent, or Firm* — Wolf, Greenfield & Sacks, P.C.

(57) ABSTRACT

An optical element includes a container including first and second end face walls, a side face wall, and an accommodating chamber inside the walls; first and second liquids enclosed in the chamber; a first electrode provided on a surface of the first end face wall; a second electrode provided on a surface of the second end face wall; an insulating film provided on a surface of the second electrode; and a unit configured to apply a voltage. The shape of an interface between the liquids is changed by a voltage application, and a light transmission path, the center of which is a virtual axis passing through the end face walls in the thickness direction of the container, is formed in a portion of the second liquid. An opening having a diameter the same as or larger than the maximum diameter of the transmission path is provided in the first electrode.

3 Claims, 29 Drawing Sheets

(56) References Cited

U.S. PATENT DOCUMENTS

| | | |
|---|---|---|
| 2007/0149939 A1 | 6/2007 | Tanaka |
| 2010/0188730 A1 | 7/2010 | Tanaka et al. |
| 2010/0328781 A1 | 12/2010 | Tanaka et al. |

FOREIGN PATENT DOCUMENTS

| | | |
|---|---|---|
| EP | 1830219 A | 9/2007 |
| JP | 2000-347005 A | 12/2000 |
| JP | 2001-013306 A | 1/2001 |
| JP | 2001-228307 A | 8/2001 |
| JP | 2003-177219 | 6/2003 |
| JP | 2007-179044 A | 7/2007 |
| JP | 2008-191313 A | 8/2008 |
| JP | 2009-037711 A | 2/2009 |
| WO | WO 2005/040866 A | 5/2005 |
| WO | WO 2007-094259 A1 | 8/2007 |

* cited by examiner

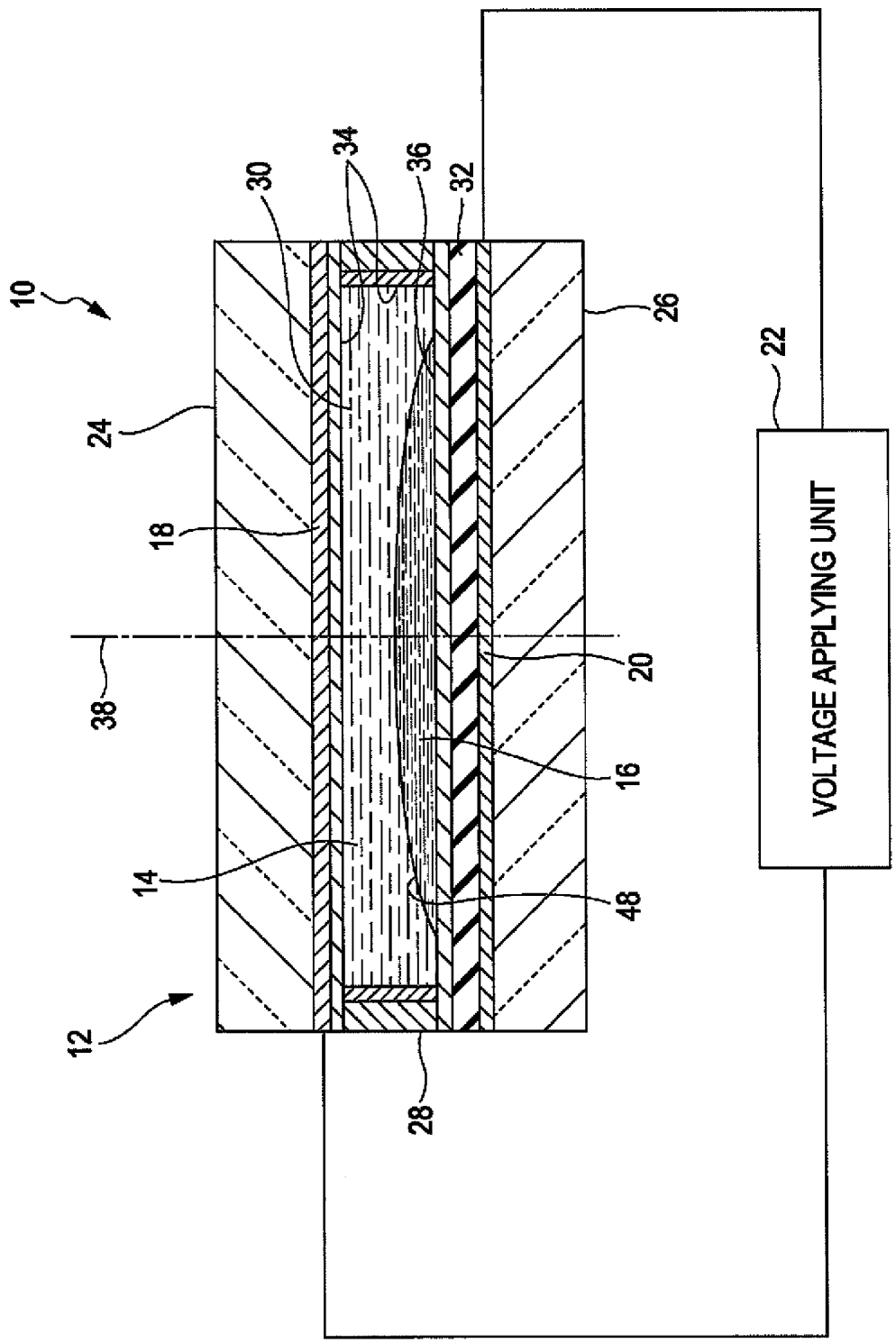

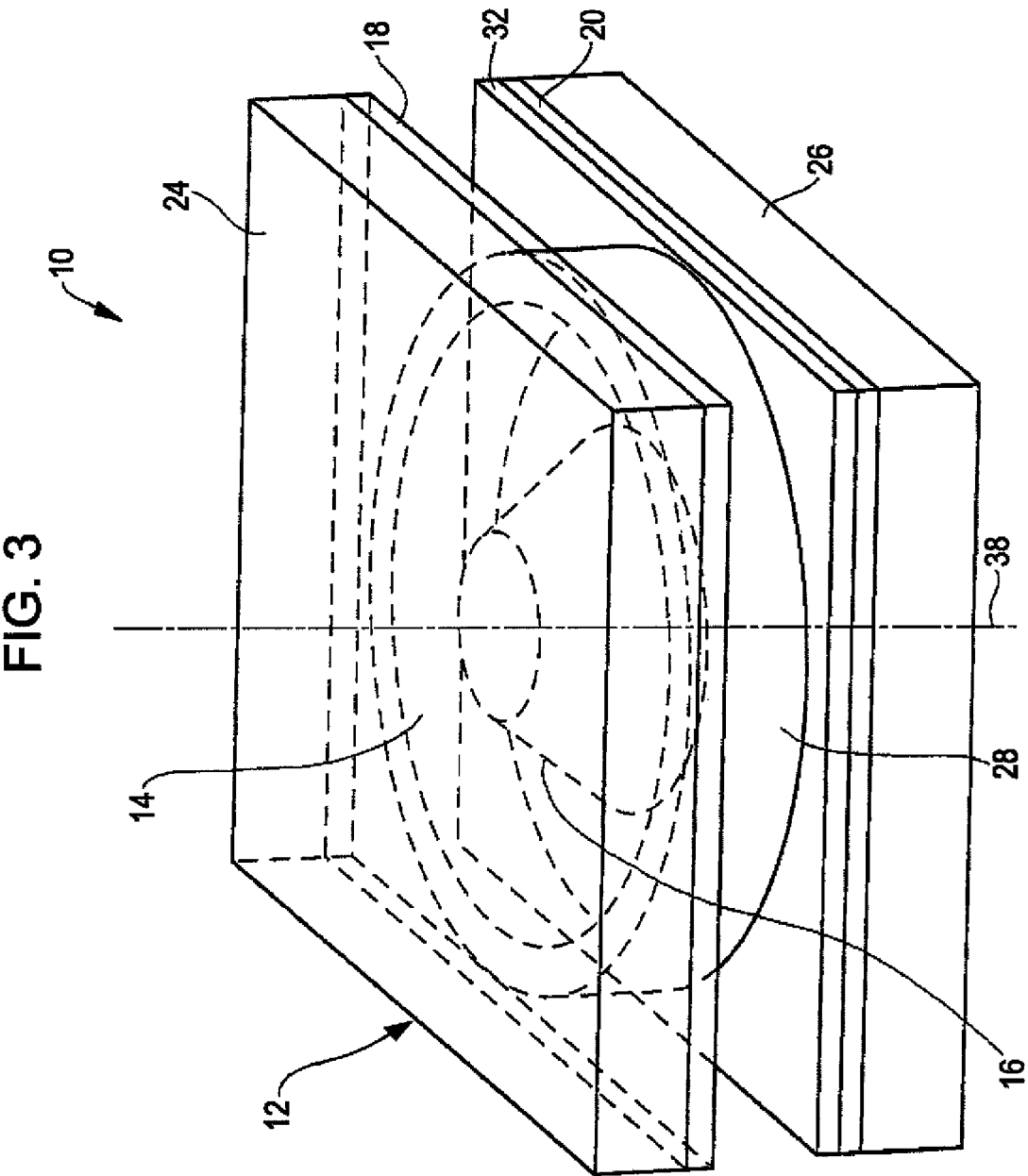

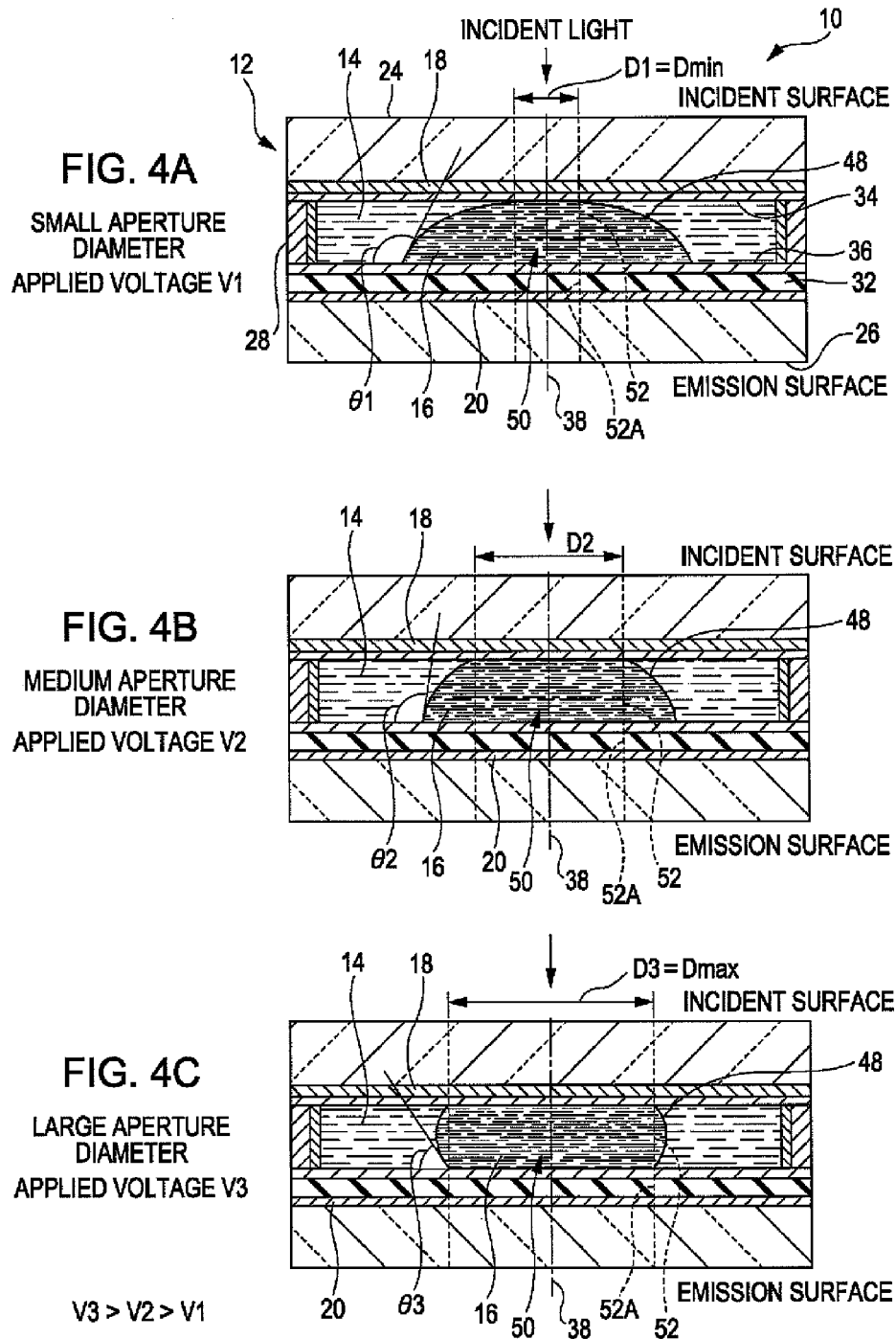

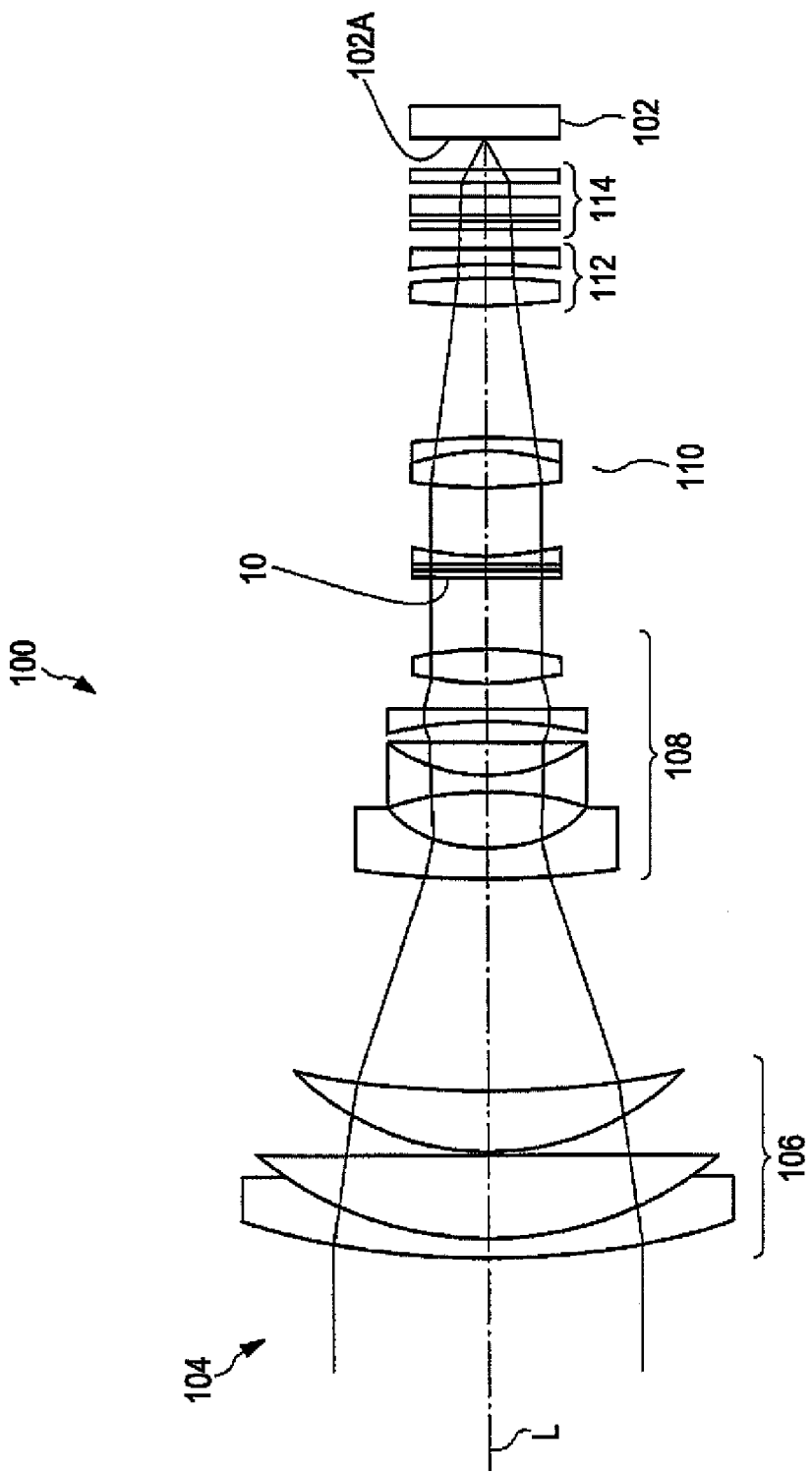

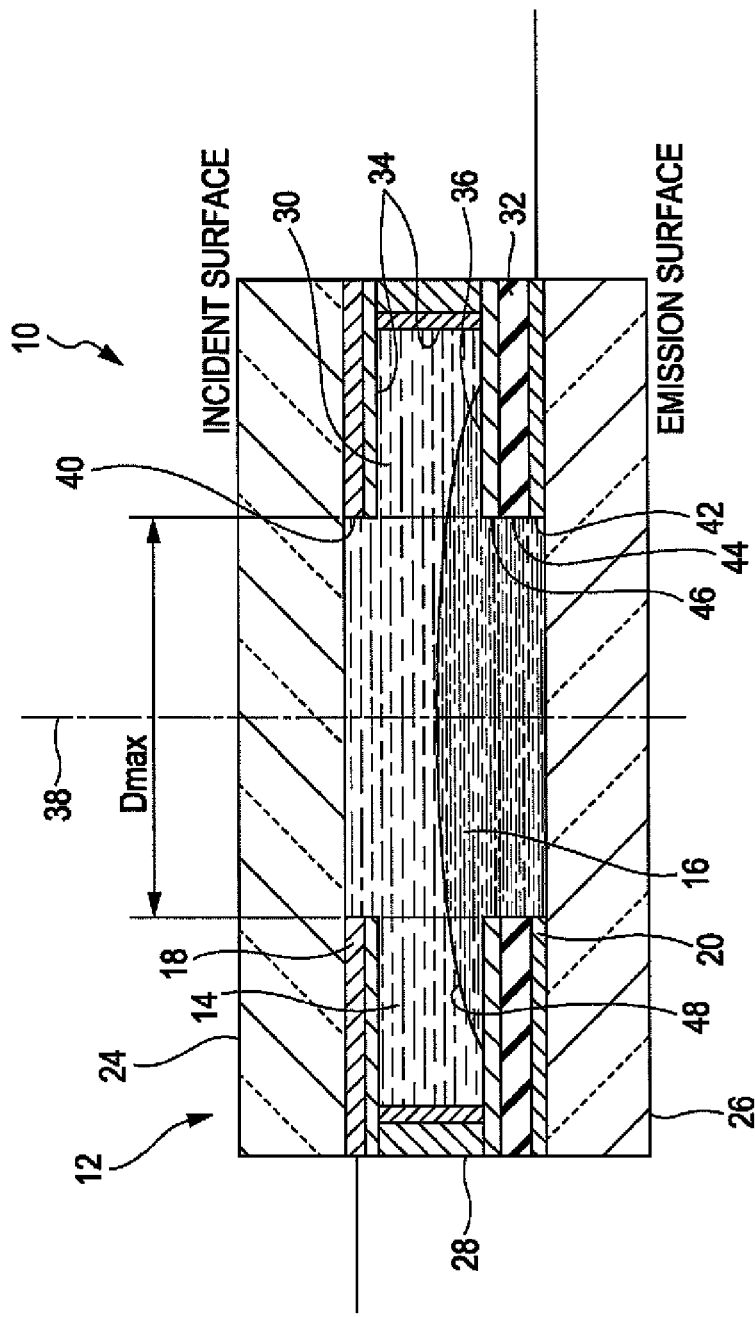

APPLIED VOLTAGE V1

APPLIED VOLTAGE V2

APPLIED VOLTAGE V3

V3 > V2 > V1

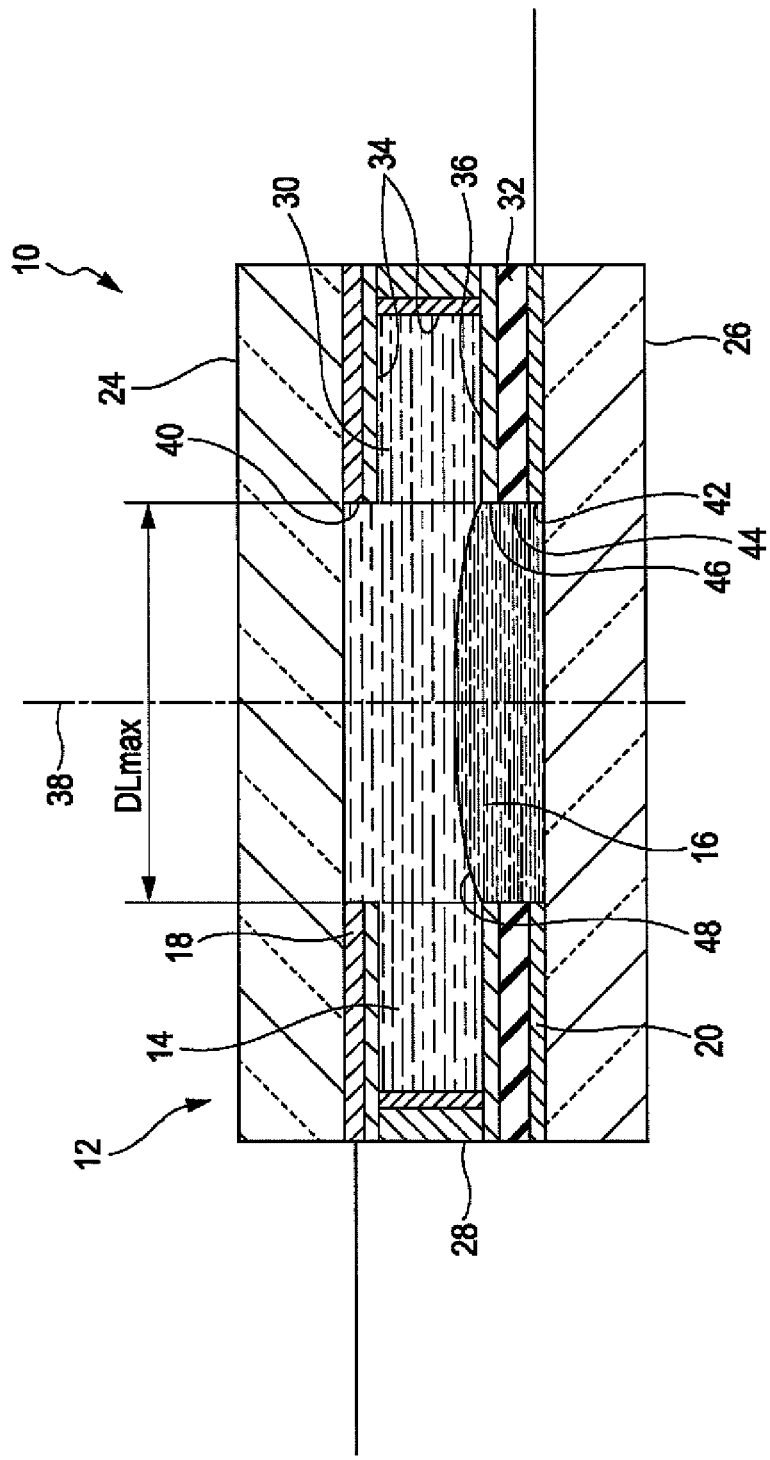

FIG. 30

| | | REFRACTIVE INDEX | SPECIFIC GRAVITY |
|---|---|---|---|
| GROUP A | WATER | 1.333 | 1 |
| | NITROMETHANE | 1.38056 | 1.1322 |
| | ACETIC ANHYDRIDE | 1.3904 | 1.082 |
| | METHYL ACETATE | 1.3614 | 0.9342 |
| | ETHYL ACETATE | 1.3719 | 0.902 |
| GROUP B | METHANOL | 1.3292 | 0.7915 |
| | ACETONITRILE | 1.34604 | 0.78745 |
| | ACETONE | 1.3591 | 0.788 |
| | ETHANOL | 1.361 | 0.789 |
| | PROPIONITRILE | 1.36585 | 0.7718 |
| | TETRAHYDROFURAN | 1.407 | 0.8892 |
| | n-HEXANE | 1.375 | 0.66 |
| | 2-PROPANOL | 1.37723 | 0.78505 |
| | 2-BUTANONE | 1.3814 | 0.805 |
| | n-BUTYRONITRILE | 1.38385 | 0.7954 |
| | 1-PROPANOL | 1.3862 | 0.8053 |
| | 1-BUTANOL | 1.3993 | 0.81 |
| GROUP C | DIMETHYL SULFOXIDE | 1.4795 | 1.1 |
| | CHLOROBENZENE | 1.5248 | 1.107 |
| | ETHYLENE GLYCOL | 1.43063 | 1.1135 |
| | FORMAMIDE | 1.44754 | 1.1334 |
| | NITROBENZENE | 1.5529 | 1.205 |
| | PROPYLENE CARBONATE | 1.4209 | 1.2065 |
| | 1,2-DICHLOROETHANE | 1.4443 | 1.2569 |
| | CARBON DISULFIDE | 1.62803 | 1.2632 |
| | CHLOROFORM | 1.4476 | 1.484 |
| | BROMOBENZENE | 1.5602 | 1.4952 |
| | CARBON TETRACHLORIDE | 1.4607 | 1.589 |
| | TRICHLOROACETIC ANHYDRIDE | 1.484 | 1.69 |
| GROUP D | TOLUENE | 1.4967 | 0.866 |
| | BENZENE | 1.50108 | 0.8787 |
| | ETHYLENEDIAMINE | 1.454 | 0.898 |
| | N,N-DIMETHYLACETAMIDE | 1.423 | 0.9429 |
| | N,N-DIMETHYLFORMAMIDE | 1.42803 | 0.9445 |
| | TRIBUTYL PHOSPHATE | 1.4215 | 0.976 |
| | PYRIDINE | 1.5092 | 0.98272 |
| | BENZONITRILE | 1.5289 | 1.01 |
| | ANILINE | 1.5863 | 1.022 |
| | 1,4-DIOXANE | 1.4175 | 1.029 |
| | HEXAMETHYLPHOSPHORAMIDE | 1.4579 | 1.0295 |

OPTICAL ELEMENT

CROSS REFERENCES TO RELATED APPLICATIONS

This application is a divisional of prior application Ser. No. 12/750,827, filed Mar. 31, 2010, which in turn is a divisional of prior application Ser. No. 12/276,838 filed Nov. 24, 2008, now granted; which claims the priority benefit of Japanese patent application number 2007-306079, filed in the Japanese Patent Office on Nov. 27, 2007, each of which is hereby incorporated by reference to the maximum extent allowable by law.

BACKGROUND OF THE INVENTION

1. Field of the Invention

The present invention relates to an optical element.

2. Description of the Related Art

An optical element whose optical property is changed by changing the shape of the interface between a first liquid and a second liquid using electrocapillarity (an electrowetting phenomenon) has been proposed.

Such an optical element includes a container having a first end face wall and a second end face wall facing each other, and a side face wall connecting the first end face wall to the second end face wall, and a hermetically sealed accommodating chamber provided inside the end face walls and the side face wall.

A first liquid having polarity or electrical conductivity, and a second liquid immiscible with the first liquid are enclosed in the accommodating chamber, and a first electrode and a second electrode for applying an electric field to the first liquid are provided. By applying a voltage between the first electrode and the second electrode, the shape of the interface between the first liquid and the second liquid is changed (see Japanese Unexamined Patent Application Publication No. 2003-177219).

SUMMARY OF THE INVENTION

In the above-described optical element, in addition to the first and second electrodes, various types of films such as an insulating film for providing an electric field to the first liquid, a hydrophilic film and a water-repellent film for increasing the moving speed of the interface between the first liquid and the second liquid are provided. This structure is disadvantageous from the standpoint that transparency of the optical element is improved.

The present invention has been made in view of this situation, and it is desirable to provide an optical element which is advantageous in the improvement of transparency.

An optical element according to an embodiment of the present invention includes a container including a first end face wall and a second end face wall facing each other, a side face wall connecting the first end face wall to the second end face wall, and a hermetically sealed accommodating chamber provided inside the end face walls and the side face wall; a first liquid having polarity or electrical conductivity and enclosed in the accommodating chamber; a second liquid immiscible with the first liquid and enclosed in the accommodating chamber; a first electrode and a second electrode configured to apply an electric field to the first liquid; an insulating film; and means for applying a voltage between the first electrode and the second electrode, wherein the transmittance of the first liquid is lower than the transmittance of the second liquid, the shape of an interface between the first liquid and the second liquid is changed by the application of the voltage with the means for applying a voltage, and a light transmission path, the center of which is a single virtual axis passing through the first end face wall and the second end face wall, and extending in the thickness direction of the container, which is a direction in which the first end face wall and the second end face wall face each other, is formed in a portion of the second liquid, the first electrode is provided on an inner surface of the first end face wall, the inner surface facing the accommodating chamber, the second electrode is provided on an inner surface of the second end face wall, the inner surface facing the accommodating chamber, the insulating film is provided on a surface of the second electrode, the surface facing the accommodating chamber, and when viewed from the thickness direction of the container, an opening having a diameter the same as or larger than the maximum diameter of the transmission path, the center of which is the virtual axis, is provided in the first electrode.

An optical element according to an embodiment of the present invention includes a container including a first end face wall and a second end face wall facing each other, a side face wall connecting the first end face wall to the second end face wall, and a hermetically sealed accommodating chamber provided inside the end face walls and the side face wall; a first liquid having polarity or electrical conductivity and enclosed in the accommodating chamber; a second liquid immiscible with the first liquid and enclosed in the accommodating chamber; a first electrode and a second electrode configured to apply an electric field to the first liquid; an insulating film; and means for applying a voltage between the first electrode and the second electrode, wherein the transmittance of the first liquid is lower than the transmittance of the second liquid, the shape of an interface between the first liquid and the second liquid is changed by the application of the voltage with the means for applying a voltage, and a light transmission path, the center of which is a single virtual axis passing through the first end face wall and the second end face wall and extending in the thickness direction of the container, which is a direction in which the first end face wall and the second end face wall face each other, is formed in a portion of the second liquid, the first electrode is provided on an inner surface of the first end face wall, the inner surface facing the accommodating chamber, the second electrode is provided on an inner surface of the second end face wall, the inner surface facing the accommodating chamber, the insulating film is provided on a surface of the second electrode, the surface facing the accommodating chamber, and when viewed from the thickness direction of the container, an opening having a diameter the same as or smaller than the maximum diameter of the transmission path, the center of which is the virtual axis, is provided in the second electrode or in each of the second electrode and the insulating film.

An optical element according to an embodiment of the present invention includes a container including a first end face wall and a second end face wall facing each other, a side face wall connecting the first end face wall to the second end face wall, and a hermetically sealed accommodating chamber provided inside the end face walls and the side face wall; a first liquid having polarity or electrical conductivity and enclosed in the accommodating chamber; a second liquid immiscible with the first liquid and enclosed in the accommodating chamber; a first electrode and a second electrode configured to apply an electric field to the first liquid; an insulating film; a film whose wettability to the second liquid is higher than the wettability to the first liquid; and means for applying a voltage between the first electrode and the second electrode, wherein the transmittance of the first liquid is lower than the transmittance of the second liquid, the shape of an interface between the first liquid and the second liquid is changed by the application of the voltage with the means for applying a voltage, and a light transmission path, the center of which is a single virtual axis passing through the first end face wall and the second end face wall and extending in the thickness direction of the container, which is a direction in which the first end face wall and the second end face wall face each other, is formed in a portion of the second liquid, the first electrode is provided on an inner surface of the first end face wall, the inner surface facing the accommodating chamber, the second electrode is provided on an inner surface of the second end face wall, the inner surface facing the accommodating chamber, the insulating film is provided on a surface of the second electrode, the surface facing the accommodating chamber, the film whose wettability to the second liquid is higher than the wettability to the first liquid is provided on a surface of the insulating film, the surface facing the accommodating chamber, and when viewed from the thickness direction of the container, an opening having a diameter the same as or smaller than the maximum diameter of the transmission path, the center of which is the virtual axis, is provided in the film provided on the surface of the insulating film.

An optical element according to an embodiment of the present invention includes a container including a first end face wall and a second end face wall facing each other, a side face wall connecting the first end face wall to the second end face wall, and a hermetically sealed accommodating chamber provided inside the end face walls and the side face wall; a first transparent liquid having polarity or electrical conductivity and enclosed in the accommodating chamber; a second transparent liquid immiscible with the first liquid and enclosed in the accommodating chamber; a first electrode and a second electrode configured to apply an electric field to the first liquid; an insulating film; and means for applying a voltage between the first electrode and the second electrode, wherein the shape of an interface between the first liquid and the second liquid is changed by the application of the voltage with the means for applying a voltage to form the interface having a curved surface, the center of which is a single virtual axis passing through the first end face wall and the second end face wall and extending in the thickness direction of the container, which is a direction in which the first end face wall and the second end face wall face each other, thereby refracting light traveling in a direction of the virtual axis and passing through the interface, the first electrode is provided on an inner surface of the first end face wall, the inner surface facing the accommodating chamber, the second electrode is provided on an inner surface of the second end face wall, the inner surface facing the accommodating chamber, the insulating film is provided on a surface of the second electrode, the surface facing the accommodating chamber, and when viewed from the thickness direction of the container, an opening having a diameter the same as or larger than the maximum diameter of the interface, the center of which is the virtual axis, is provided in the first electrode.

An optical element according to an embodiment of the present invention includes a container including a first end face wall and a second end face wall facing each other, a side face wall connecting the first end face wall to the second end face wall, and a hermetically sealed accommodating chamber provided inside the end face walls and the side face wall; a first transparent liquid having polarity or electrical conductivity and enclosed in the accommodating chamber; a second transparent liquid immiscible with the first liquid and enclosed in the accommodating chamber; a first electrode and a second electrode configured to apply an electric field to the first liquid; an insulating film; and means for applying a voltage between the first electrode and the second electrode, wherein the shape of an interface between the first liquid and the second liquid is changed by the application of the voltage with the means for applying a voltage to form the interface having a curved surface, the center of which is a single virtual axis passing through the first end face wall and the second end face wall and extending in the thickness direction of the container, which is a direction in which the first end face wall and the second end face wall face each other, thereby refracting light traveling in a direction of the virtual axis and passing through the interface, the first electrode is provided on an inner surface of the first end face wall, the inner surface facing the accommodating chamber, the second electrode is provided on an inner surface of the second end face wall, the inner surface facing the accommodating chamber, the insulating film is provided on a surface of the second electrode, the surface facing the accommodating chamber, and when viewed from the thickness direction of the container, an opening having a diameter the same as or smaller than the maximum diameter of the interface, the center of which is the virtual axis, is provided in the second electrode or in each of the second electrode and the insulating film.

An optical element according to an embodiment of the present invention includes a container including a first end face wall and a second end face wall facing each other, a side face wall connecting the first end face wall to the second end face wall, and a hermetically sealed accommodating chamber provided inside the end face walls and the side face wall; a first transparent liquid having polarity or electrical conductivity and enclosed in the accommodating chamber; a second transparent liquid immiscible with the first liquid and enclosed in the accommodating chamber; a first electrode and a second electrode configured to apply an electric field to the first liquid; an insulating film; a film whose wettability to the second liquid is higher than the wettability to the first liquid; and means for applying a voltage between the first electrode and the second electrode, wherein the shape of an interface between the first liquid and the second liquid is changed by the application of the voltage with the means for applying a voltage to form the interface having a curved surface, the center of which is a single virtual axis passing through the first end face wall and the second end face wall and extending in the thickness direction of the container, which is a direction in which the first end face wall and the second end face wall face each other, thereby refracting light traveling in a direction of the virtual axis and passing through the interface, the first electrode is provided on an inner surface of the first end face wall, the inner surface facing the accommodating chamber, the second electrode is provided on an inner surface of the second end face wall, the inner surface facing the accommodating chamber, the insulating film is provided on a surface of the second electrode, the surface facing the accommodating chamber, the film whose wettability to the second liquid is higher than the wettability to the first liquid is provided on a surface of the insulating film, the surface facing the accommodating chamber, and when viewed from the thickness direction of the container, an opening having a diameter the same as or smaller than the maximum diameter of the interface, the center of which is the virtual axis, is provided in the film provided on the surface of the insulating film.

In the optical element according to an embodiment of the present invention, light transmits through the opening provided in a first electrode, a water-repellent film, an insulating film, or a second electrode. Accordingly, the optical element is advantageous in the improvement of transparency.

BRIEF DESCRIPTION OF THE DRAWINGS

FIG. 2 is a longitudinal cross-sectional view showing the basic structure of an optical element 10;

FIG. 3 is a perspective view showing the basic structure of the optical element 10;

FIGS. 4A, 4B, and 4C are cross-sectional views illustrating an operation when voltages V1, V2, and V3 are applied between a first electrode 18 and a second electrode 20 of the optical element 10, respectively;

FIG. 5 is a schematic view showing an example in which the optical element 10 is applied to an imaging optical system of an image-pickup apparatus;

FIG. 6 is a longitudinal cross-sectional view showing the structure of an optical element 10 according to a first embodiment;

FIG. 9 is a longitudinal cross-sectional view showing the structure of the optical element 10 according to the second embodiment;

FIG. 30 is a table showing numerical values of the specific gravities and the refractive indices of various types of liquids used.

DESCRIPTION OF THE PREFERRED EMBODIMENTS

First Embodiment

Before an optical element 10 of this embodiment is described, first, the principle of electrocapillarity (an electrowetting phenomenon) used by an optical element according to an embodiment of the present invention will be described.

Figure 1A:
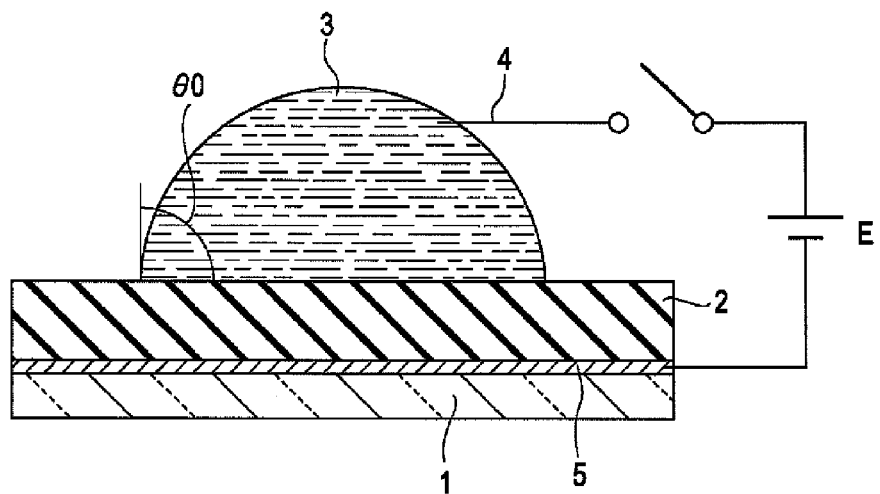
FIG. 1A is a view illustrating the principle of electrocapillarity and shows a state before a voltage is applied.
Figure 1B:
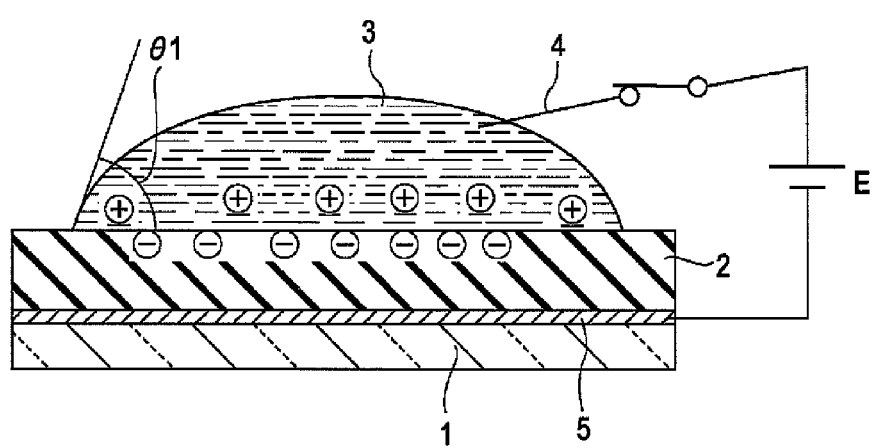
FIG. 1B is a view illustrating the principle of electrocapillarity and shows a state after a voltage is applied.

FIGS. 1A and 1B are views illustrating the principle of electrocapillarity. FIG. 1A shows a state before a voltage is applied and FIG. 1B shows a state after a voltage is applied.

As shown in FIG. 1A, an insulating film 2 is provided on a substrate 1. A first liquid 3 having polarity or electrical conductivity is disposed on a surface of the insulating film 2. A first electrode 4 is electrically connected to the first liquid 3.

A second electrode 5 is provided between the insulating film 2 and the substrate 1.

As shown in FIG. 1A, when no voltage E is applied between the first electrode 4 and the second electrode 5, the surface of the first liquid 3 has a substantially spherical surface projecting upward due to surface tension. In this case, an angle $\theta$ formed by the surface of the insulating film 2 and a liquid surface at a portion where the first liquid 3 is in contact with the insulating film 2, i.e., the angle of contact $\theta$ is defined as $\theta 0$. Note that the angle of contact $\theta$ is measured in a state in which a liquid faces air. That is, the angle of contact $\theta$ is measured at a gas-liquid interface.

In contrast, as shown in FIG. 1B, when an electric field is applied to the first liquid 3 by applying a voltage E between the first electrode 4 and the second electrode 5, for example, minus charges are generated on the surface of the insulating film 2, and thus, the electric field (electrostatic force) acts on molecules constituting the first liquid 3. Accordingly, the molecules constituting the first liquid 3 are attracted to each other to improve the wettability of the first liquid 3 on the insulating film 2. As a result, the angle of contact $\theta$ becomes $\theta 1$ that is smaller than $\theta 0$. The angle of contact $\theta$ decreases as the value of the voltage E increases.

This phenomenon is referred to as electrocapillarity.

Next, the basic structure and operation that constitute a prerequisite of the optical element 10 of the first embodiment will be described.

In this embodiment, the optical element 10 constitutes a diaphragm.

FIG. 2 is a longitudinal cross-sectional view showing the basic structure of the optical element 10, and FIG. 3 is a perspective view showing the basic structure of the optical element 10.

As shown in FIGS. 2 and 3, the optical element 10 includes a container 12, a first liquid 14, a second liquid 16, a first electrode 18, a second electrode 20, and a voltage applying unit 22.

The container 12 includes a first end face wall 24 and a second end face wall 26 facing each other and extending in parallel, and a side face wall 28 connecting the first end face wall 24 to the second end face wall 26. The container 12 includes an accommodating chamber 30 that is hermetically sealed by the first end face wall 24, the second end face wall 26, and the side face wall 28.

Herein, a term "thickness direction of the container 12" means a direction in which the first end face wall 24 and the second end face wall 26 face each other.

The first end face wall 24 and the second end face wall 26 are rectangular plates having the same shape and the same size. The side face wall 28 is a cylindrical wall having a size that falls within the outline of the first end face wall 24 and the second end face wall 26. The accommodating chamber 30 has a flat circular column shape.

The first end face wall 24, the second end face wall 26, and the side face wall 28 are made of insulating materials. Furthermore, the first end face wall 24 and the second end face wall 26 are made of transparent and light-transmissive materials.

Examples of the material constituting the first end face wall 24 and the second end face wall 26 include transparent and insulating synthetic resin materials, and transparent glass materials.

The first liquid 14 has polarity or electrical conductivity, and is enclosed in the accommodating chamber 30.

The second liquid 16 is immiscible with the first liquid 14 and is also enclosed in the accommodating chamber 30.

The first liquid 14 and the second liquid 16 have substantially the same specific gravity. In addition, the transmittance of the first liquid 14 is lower than the transmittance of the second liquid 16.

Since the first liquid 14 and the second liquid 16 have substantially the same specific gravity, an interface 48 (FIG. 2) between the first liquid 14 and the second liquid 16 maintains a stable shape without being affected by the gravity.

Furthermore, since the transmittance of the first liquid 14 is lower than the transmittance of the second liquid 16, a light transmission path 52 (FIG. 4) is formed by the second liquid 16.

In this embodiment, the first liquid 14 is prepared by mixing fine particles made of a material that does not transmit light with a mixed liquid containing pure water, ethanol, and ethylene glycol.

As the fine particles, for example, carbon black can be used. When carbon black is used, it is preferable that a hydrophilic coating treatment is performed on the surfaces of the carbon black particles so that the carbon black particles can be uniformly mixed with the first liquid 14. The hydrophilic coating treatment can be performed by, for example, forming a hydrophilic group on the surfaces of the carbon black particles.

In this embodiment, the second liquid 16 is composed of silicone oil.

The liquid that can be used as the first liquid 14 is not limited to the liquid used in this embodiment. Examples thereof further include nitromethane, acetic anhydride, methyl acetate, ethyl acetate, methanol, acetonitrile, acetone, ethanol, propionitrile, tetrahydrofuran, n-hexane, 2-propanol, 2-butanone, n-butyronitrile, 1-propanol, 1-butanol, dimethyl sulfoxide, chlorobenzene, ethylene glycol, formamide, nitrobenzene, propylene carbonate, 1,2-dichloroethane, carbon disulfide, chloroform, bromobenzene, carbon tetrachloride, trichloroacetic anhydride, toluene, benzene, ethylenediamine, N,N-dimethylacetamide, N,N-dimethylformamide, tributyl phosphate, pyridine, benzonitrile, aniline, 1,4-dioxane, and hexamethylphosphoramide.

Examples of the liquid that can be used as the second liquid 16 include silicones, decanes, octanes, nonanes, and heptanes.

Each of the first liquid 14 and the second liquid 16 may be composed of a single liquid or a mixture of a plurality of liquids. It is sufficient that the first liquid 14 and the second liquid 16 have substantially the same specific gravity.

Furthermore, the compositions of the first liquid 14 and the second liquid 16 will be described.

First, the first liquid 14 will be described. The first liquid 14 is prepared by mixing three types of liquids having different specific gravities and different refractive indices. The inventors of the present invention have found that, by changing the mixing ratio of the three types of liquids, each of the specific gravity and the refractive index of the first liquid 14 can be changed over a wide range.

For example, first, a description will be made of a case where the first liquid 14 is prepared using two types of liquids.

The first liquid 14 is prepared using pure water and ethanol as the two types of liquids, and the mixing ratio of ethanol to pure water is changed.

Figure 26:
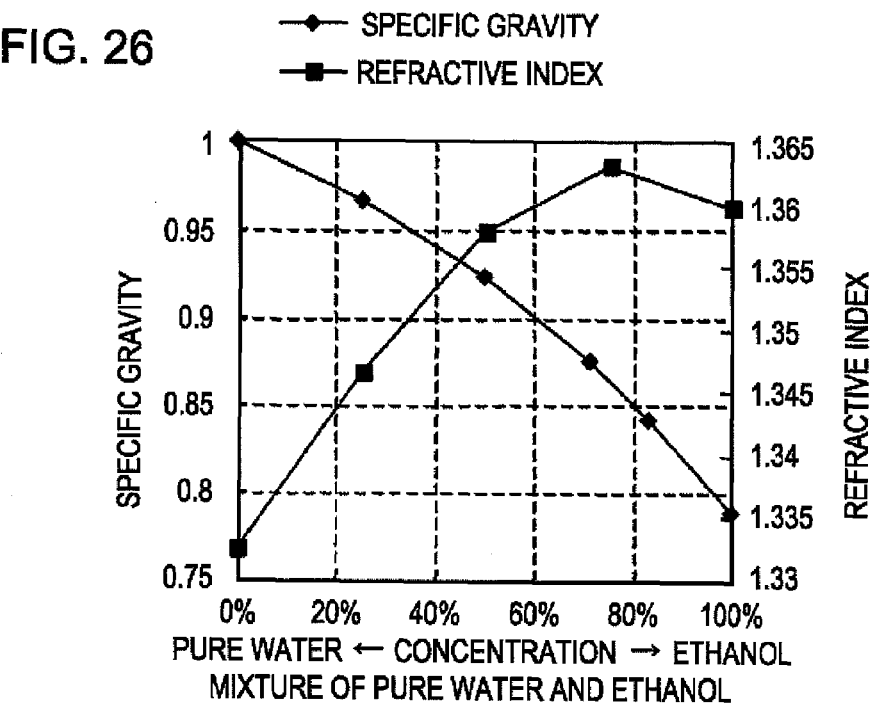
FIG. 26 is a graph showing the relationship between a mixing ratio of ethanol to pure water and the specific gravity, and the relationship between the mixing ratio and the refractive index.

As shown in FIG. 26, when the mixing ratio of ethanol to pure water is changed, the specific gravity and the refractive index of the first liquid 14 change linearly or follow a curve.

Alternatively, the first liquid 14 is prepared using pure water and ethylene glycol as the two types of liquids, and the mixing ratio of ethylene glycol to pure water is changed.

Figure 27:
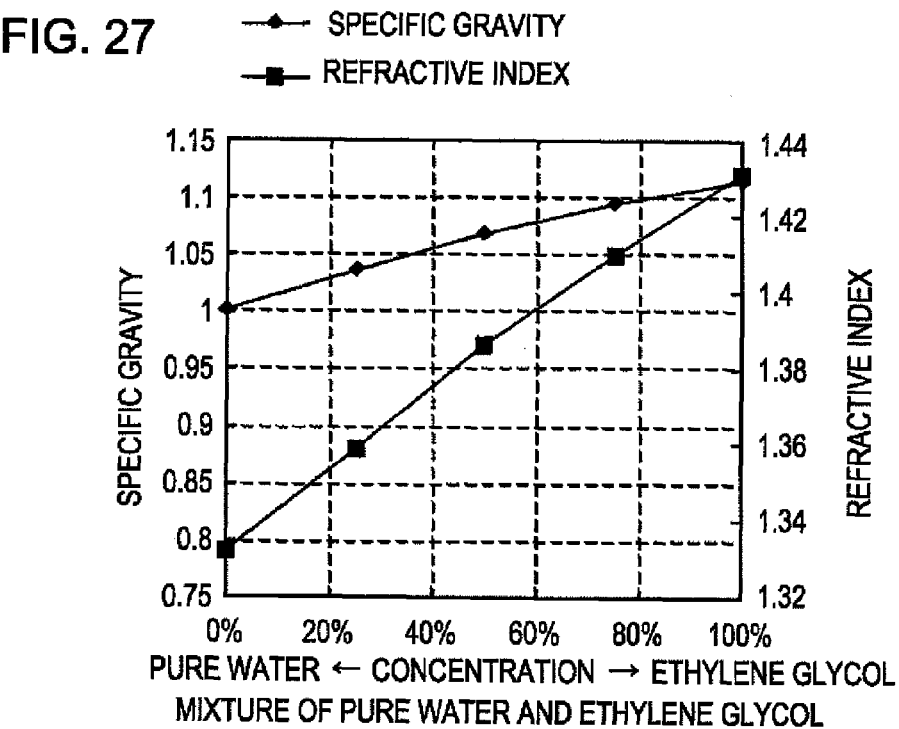
FIG. 27 is a graph showing the relationship between a mixing ratio of ethylene glycol to pure water and the specific gravity, and the relationship between the mixing ratio and the refractive index.

As shown in FIG. 27, when the mixing ratio of ethylene glycol to pure water is changed, the specific gravity and the refractive index of the first liquid 14 change linearly or follow a curve.

Note that the specific gravity of pure water is 1.0, and the refractive index of pure water is 1.333. The specific gravity of ethanol is 0.789, and the refractive index of ethanol is 1.361. The specific gravity of ethylene glycol is 1.113, and the refractive index of ethylene glycol is 1.430.

In contrast, the first liquid 14 is prepared using three types of liquids, and the mixing ratio of the liquids is changed.

For example, the first liquid 14 is prepared using pure water, ethanol, and ethylene glycol as the three types of liquids, and the mixing ratio thereof is changed.

Figure 28:
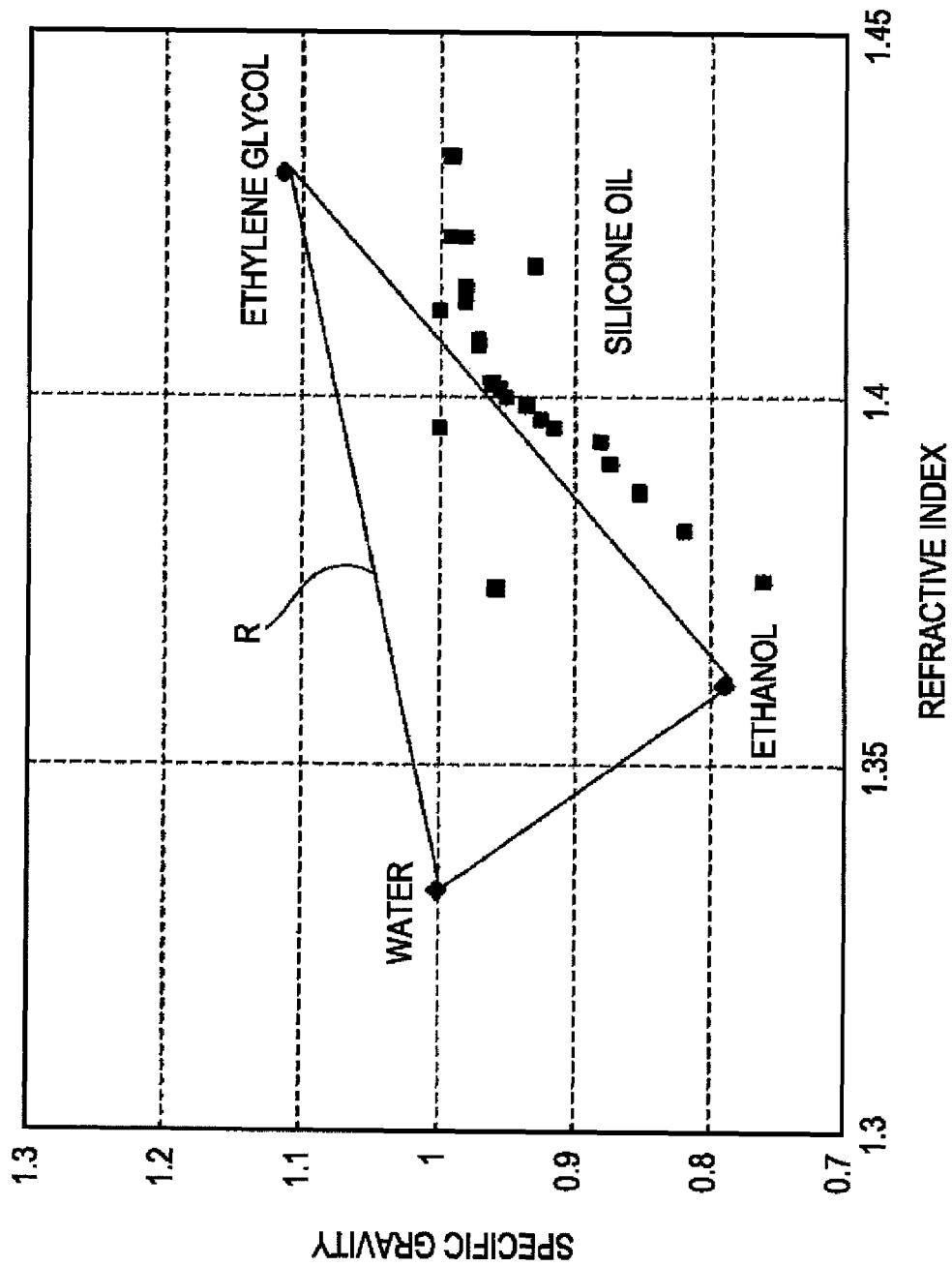
FIG. 28 is a graph showing the specific gravities and the refractive indices of pure water, ethanol, and ethylene glycol.

As shown in FIG. 28, by changing the mixing ratio of pure water, ethanol, and ethylene glycol, the specific gravity and the refractive index of the first liquid 14 can be changed in a large triangle area R defined by joining three coordinates of pure water, ethanol, and ethylene glycol.

In addition, in FIG. 28, coordinates of the specific gravity and the refractive index of various types of commercially available silicone oil are plotted.

Accordingly, commercially available silicone oil plotted in the triangle area R can be used as the second liquid 16, and a liquid prepared by mixing pure water, ethanol, and ethylene glycol so that the specific gravity and the refractive index of the resulting mixed liquid are the same as those of the above silicone oil can be used as the first liquid 14.

In this embodiment, the first liquid 14 is prepared by dissolving carbon black in a mixed liquid containing pure water, ethanol, and ethylene glycol, and is black. The first liquid 14 is configured so that the first liquid 14 with a thickness of about 0.1 mm can block light. This structure is advantageous in that the thickness of the optical element can be reduced.

When the optical element 10 is configured so that the refractive index of the first liquid 14 is the same as the refractive index of the second liquid 16, generation of a lens effect at the interface 48 can be prevented. This is advantageous in that the operation of the diaphragm is reliably performed.

Furthermore, when the first liquid 14 is prepared by mixing ethanol with water, the solidifying point (melting point) of the first liquid 14 can be decreased, and thus, solidification in cold climate areas can be prevented. Accordingly, the optical element 10 can be used in cold climate areas.

The solidifying point of ethanol is −114° C., and the solidifying point of ethylene glycol is −13° C. Accordingly, the solidifying point of the first liquid 14 can be reduced to −40° C. or lower.

As described above, instead of selecting two liquids having the same specific gravity as the first liquid 14 and the second liquid 16, a mixture of existing three types of liquids having different specific gravities is used as the first liquid 14. Thereby, the specific gravity of the first liquid 14 can be changed over a wide range, as shown in the area R of FIG. 28.

More specifically, when two types of liquids having different specific gravities are mixed with each other, the specific gravity of the first liquid 14 obtained by changing the mixing ratio of the two types of liquids is changed only within the ranges represented by straight lines joining the coordinates of the two types of liquids, as shown in FIG. 28.

In contrast, when three types of liquids are mixed with each other, the specific gravity of the first liquid 14 can be changed in the large triangle area R defined by joining three coordinates of pure water, ethanol, and ethylene glycol.

Accordingly, the specific gravity of the first liquid 14 can be easily made equal to that of the second liquid 16, and thus, the optical element 10 having a desired property can be readily produced.

Furthermore, as shown in FIG. 28, when the first liquid 14 is prepared by mixing at least three types of liquids having different specific gravities and different refractive indices, for example, pure water, ethanol, and ethylene glycol, the specific gravity of the first liquid 14 can be easily made equal to the specific gravity of the second liquid 16, and in addition, the refractive index of the first liquid 14 can be easily made equal to the refractive index of the second liquid 16 at the same time. Accordingly, this is advantageous in that generation of a lens effect can be prevented.

A description has been made of a case where the first liquid 14 is prepared using pure water, ethanol, and ethylene glycol as a plurality types of liquids. The plurality types of liquids used are not limited to pure water, ethanol, and ethylene glycol, and various types of existing liquids can be selected.

A description will be made with reference to FIGS. 29 and 30.

Figure 29:
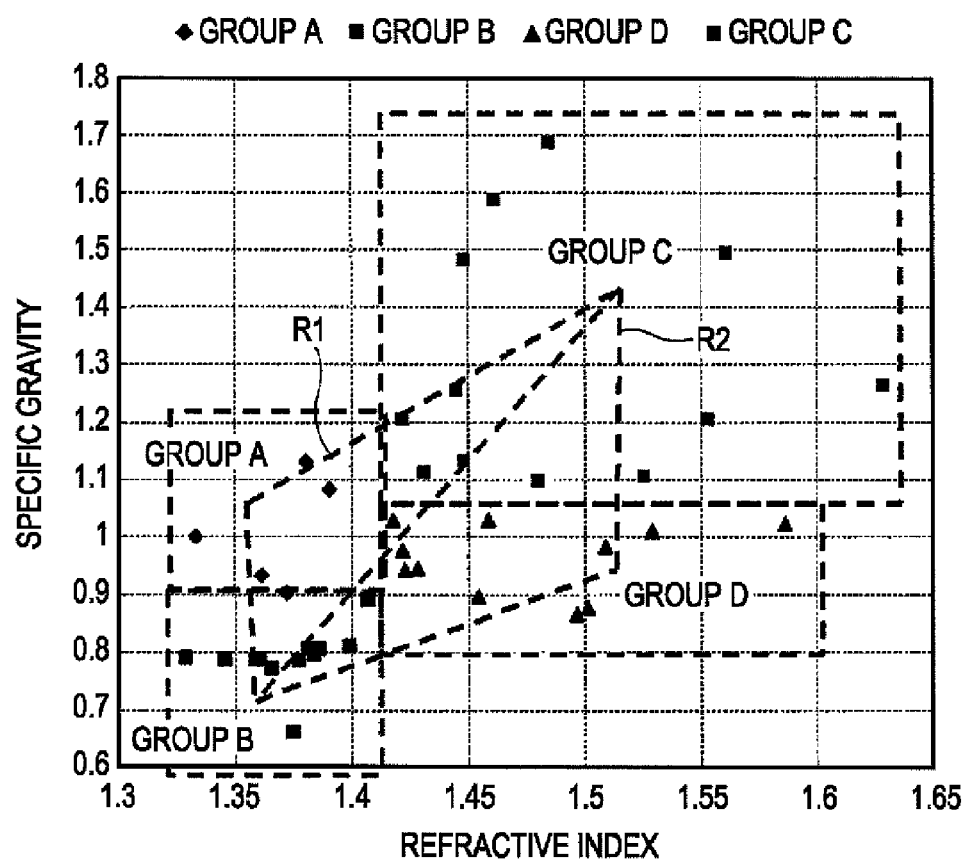
FIG. 29 is a graph showing the specific gravities and the refractive indices of various types of liquids.

FIG. 29 is a graph showing the specific gravities and the refractive indices of various types of liquids, and FIG. 30 is a table showing numerical values of the specific gravities and the refractive indices of various types of liquids used.

For example, as shown in FIG. 29, examples of liquids used include liquids classified in group A, group B, group C, and group D. Specific compounds of the liquids used in groups A to D are shown in FIG. 30.

As shown in a triangle area R1 of FIG. 29, by changing the mixing ratio of three types of liquids within the large triangle area R1 defined by joining coordinates of a liquid selected from group A, coordinates of a liquid selected from group B, and coordinates of a liquid selected from group C, the specific gravity and the refractive index can be changed.

In addition, as shown in a triangle area R2 of FIG. 29, by changing the mixing ratio of three types of liquids within the large triangle area R2 defined by joining coordinates of a liquid selected from group B, coordinates of a liquid selected from group C, and coordinates of a liquid selected from group D, the specific gravity and the refractive index can be changed.

That is, the specific gravity and the refractive index can be easily changed by selecting various types of existing liquids and changing the mixing ratio of the liquids.

The number of types of liquids used as the first liquid 14 is not limited to three, and may be four or more.

A description has been made of a case where the specific gravity of the first liquid 14 is adjusted to be equal to the specific gravity of the second liquid 16 by mixing plurality types of liquids having different specific gravities and different refractive indices. Alternatively, the specific gravity of the second liquid 16 may be adjusted to be equal to the specific gravity of the first liquid 14 by mixing plurality types of liquids having different specific gravities and different refractive indices.

Furthermore, in this embodiment, a case where a single type of silicone oil is used as the second liquid 16 has been described. However, plurality types of silicone oil having different properties such as the refractive index and the specific gravity are available. Accordingly, a single type of silicone oil having a desired property may be selected and used as the second liquid 16, or plurality types of silicone oil having different properties may be selected and the refractive index and the specific gravity are adjusted to desired values by changing the mixing ratio thereof, and the resulting mixture may then be used as the second liquid 16.

The first electrode 18 and the second electrode 20 are used for applying an electric field to the first liquid 14 to generate electrocapillarity in the first liquid 14.

In the basic structure, as described below, a hydrophilic film 34 is used in order to increase the operation speed of the diaphragm. The hydrophilic film 34 is provided at a position where the first electrode 18 faces the first liquid 14. That is, the first electrode 18 is provided so as to face the first liquid 14 with the hydrophilic film 34 therebetween.

The second electrode 20 is provided on the inner surface of the second end face wall 26, the inner surface facing the accommodating chamber 30.

In this basic structure, the first electrode 18 is provided on the entire area of the inner surface of the first end face wall 24, and the second electrode 20 is provided on the entire area of the inner surface of the second end face wall 26.

Each of the first electrode 18 and the second electrode 20 is composed of, for example, a light-transmissive conductive material such as an indium tin oxide (ITO) film.

The voltage applying unit 22 is provided outside the container 12, and the voltage output from the voltage applying unit 22 is variable. A positive voltage output terminal of the voltage applying unit 22 is electrically connected to the first electrode 18, and a negative voltage output terminal of the voltage applying unit 22 is electrically connected to the second electrode 20.

In this basic structure, a description will be made of a case where electrocapillarity is generated by applying a DC voltage to the first liquid 14. However, the voltage applied to the first liquid 14 is not limited to a DC voltage. Any voltage such as an AC voltage, a pulse voltage, or a voltage increasing or decreasing stepwise may be used as long as electrocapillarity is generated in the first liquid 14.

Furthermore, in this basic structure, an insulating film 32 is provided on the entire area on the second electrode 20 provided on the inner surface of the second end face wall 26, the inner surface facing the accommodating chamber 30.

The insulating film 32 is also used for generating electrocapillarity in the first liquid 14 by applying an electric field to the first liquid 14.

More specifically, by applying a voltage between the first electrode 18 and the second electrode 20, for example, minus charges are generated on the surface of the insulating film 32, thereby applying an electric field to the first liquid 14. The electric field (electrostatic force) acts on molecules constituting the first liquid 14, thus generating electrocapillarity.

In this basic structure, as shown in FIG. 2, in order to increase the operation speed of the diaphragm, a light-transmissive, transparent hydrophilic film 34 (i.e., a film whose wettability to the first liquid is higher than the wettability to the second liquid according to an embodiment of the present invention) is further provided so as to cover the entire area on the first electrode 18 and the entire area of the side face wall 28, as described below.

This hydrophilic film 34 is configured so that the wettability to the first liquid 14 is higher than the wettability to the second liquid 16. That is, the hydrophilic film 34 is configured so that the angle of contact of the first liquid 14 to the hydrophilic film 34 is smaller than the angle of contact of the second liquid 16 to the hydrophilic film 34.

The hydrophilic film 34 can be formed by applying, for example, a hydrophilic polymer or a surfactant to the inner surfaces of the first electrode 18 and the side face wall 28. Various types of existing materials can be used as the hydrophilic film 34.

In this basic structure, as shown in FIG. 2, in order to increase the operation speed of the diaphragm, a light-transmissive, transparent water-repellent film 36 (i.e., a film whose wettability to the second liquid is higher than the wettability to the first liquid according to an embodiment of the present invention) is further provided so as to cover the entire area on the insulating film 32 provided on the second electrode 20 on the second end face wall 26, as described below.

This water-repellent film 36 is configured so that the wettability to the second liquid 16 is higher than the wettability to the first liquid 14. That is, the water-repellent film 36 is configured so that the angle of contact of the second liquid 16 to the water-repellent film 36 is smaller than the angle of contact of the first liquid 14 to the water-repellent film 36.

The water-repellent film 36 is a film having lipophilicity. The water-repellent film 36 can be formed by baking a material containing silicon as a main component, or by forming a film made of an amorphous fluorocarbon resin. Various types of existing materials can be used as the water-repellent film 36.

In FIG. 3, illustration of the hydrophilic film 34 and the water-repellent film 36 is omitted.

According to this basic structure, as shown in FIG. 2, the entire area of the first liquid 14 located on the inner surface of the first end face wall 24 on which the first liquid 14 is disposed faces the first electrode 18 with the hydrophilic film 34 therebetween. In addition, the entire area of the second liquid 16 located on the inner surface of the second end face wall 26 on which the second liquid 16 is disposed faces the second electrode 20 with the water-repellent film 36 and the insulating film 32 therebetween.

Accordingly, when a voltage V is applied from the voltage applying unit 22 to the first electrode 18 and the second electrode 20, for example, minus charges are generated on the surface of the insulating film 32. Thereby, an electric field is applied to the first liquid 14, and the electric field (electrostatic force) acts on molecules constituting the first liquid 14, thus generating electrocapillarity.

Next, the operation of the optical element 10 in the basic structure will be described.

FIGS. 4A, 4B, and 4C are cross-sectional views illustrating an operation when voltages V1, V2, and V3 are applied between the first electrode 18 and the second electrode 20 of the optical element 10, respectively.

As shown in FIG. 2, in a state in which no voltage V is applied from the voltage applying unit 22 to the first electrode 18 and the second electrode 20, the shape of the interface 48 between the first liquid 14 and the second liquid 16 is determined by a balance between surface tensions of the first liquid 14 and the second liquid 16 and interfacial tension on the water-repellent film 36.

Accordingly, as the difference between the angle of contact of the first liquid 14 to the water-repellent film 36 and the angle of contact of the second liquid 16 to the water-repellent film 36 increases, the second liquid 16 expands on the water-repellent film 36 more flatly. As a result, the shape of the interface 48 between the first liquid 14 and the second liquid 16 becomes a curved surface close to a flat surface.

The first liquid 14 is disposed so as to cover the hydrophilic film 34 provided on the first end face wall 24 and the hydrophilic film 34 provided on the side face wall 28.

Accordingly, a part of the first liquid 14 disposed on an annular portion near the interface between the side face wall 28 and the second end face wall 26 directly contacts the water-repellent film 36, but the second liquid 16 is not in contact with the hydrophilic film 34 provided on the side face wall 28.

Therefore, the annular portion in which the first liquid 14 is in contact with the water-repellent film 36 faces the second electrode 20, with the water-repellent film 36 and the insulating film 32 therebetween, without interposing the second liquid 16.

In this state, the first liquid 14 is disposed so as to extend over the entire area in a direction orthogonal to the transmission direction of light, and thus the light transmitting in the thickness direction of the container 12 is blocked.

Next, as shown in FIG. 4A, when a voltage V1 (>0) is applied from the voltage applying unit 22 to the first electrode 18 and the second electrode 20, the shape of the interface 48 is changed so as to form a curved surface (spherical surface) projecting from the second liquid 16 toward the first liquid 14 by electrocapillarity, and the center of the interface 48 contacts the first end face wall 24 (hydrophilic film 34).

In this state, the first liquid 14 is not present in an area where the interface 48 is in contact with the first end face wall 24 (hydrophilic film 34). As a result, an area 50 where only the second liquid 16 is present is formed in the accommodating chamber 30. This area 50 forms a light transmission path 52 passing through the first end face wall 24 and the second end face wall 26 and extending in the thickness direction of the container 12. More specifically, the light transmission path 52 constitutes an aperture 52A, and the diameter of the light transmission path 52 (aperture 52A) is defined as an aperture diameter D1 of the diaphragm.

That is, by applying an electric field to the first liquid 14, the shape of the interface between the first liquid 14 and the second liquid 16 is changed to form the light transmission path 52 composed of a part of the second liquid 16. The center of the light transmission path 52 is a single virtual axis passing through the first end face wall 24, the part of the second liquid 16, and the second end face wall 26 and extending in the thickness direction of the container 12, i.e., in the direction in which the first end face wall 24 and the second end face wall 26 face each other.

Next, as shown in FIG. 4B, when a voltage V2 (>V1) is applied from the voltage applying unit 22 to the first electrode 18 and the second electrode 20, the slope of the curvature of the convex surface (spherical surface) of the interface 48 is further increased.

Accordingly, the diameter of the area 50 which is formed in the accommodating chamber 30 and in which only the second liquid 16 is present is increased. Consequently, the diameter of the light transmission path 52, i.e., the aperture diameter of the diaphragm is increased from D1 to D2.

Next, as shown in FIG. 4C, when a voltage V3 (>V2) is applied from the voltage applying unit 22 to the first electrode 18 and the second electrode 20, the slope of the curvature of the convex surface (spherical surface) of the interface 48 is further increased.

Accordingly, the diameter of the area 50 which is formed in the accommodating chamber 30 and in which only the second liquid 16 is present is further increased. Consequently, the diameter of the light transmission path 52, i.e., the aperture diameter of the diaphragm is increased to the maximum diameter of D3 (>D2).

Accordingly, by adjusting the voltage applied from the voltage applying unit 22 to the first electrode 18 and the second electrode 20, the diameter of the area 50 in which only the second liquid 16 is present is increased or decreased to adjust the aperture diameter of the diaphragm.

In FIGS. 4A, 4B, and 4C, θ1, θ2, and θ3 each represent the angle of contact of the first liquid 14. As the electric field applied to the first liquid 14 increases, the angle of contact decreases, i.e., θ1>θ2>θ3, and the wettability of the first liquid 14 increases.

The hydrophilic film 34 and the water-repellent film 36 may be omitted. However, it is preferable that the hydrophilic film 34 and the water-repellent film 36 are provided from the standpoint of ensuring the performance of the optical element 10 because the presence of the hydrophilic film 34 and the water-repellent film 36 provides the following advantages.

When a light-transmissive, transparent hydrophilic film 34 is provided so as to cover the entire area of the first electrode 18 and the entire area of the inner surface of the side face wall 28, the first liquid 14 is satisfactorily wetted with the hydrophilic film 34. Accordingly, when the second liquid 16 once contacts the first end face wall 24 and is then away from the first end face wall 24, the second liquid 16 is readily separated from the hydrophilic film 34, thus increasing the operation speed of the diaphragm.

When a light-transmissive, transparent water-repellent film 36 is provided so as to cover the entire area of the insulating film 32 provided on the second electrode 20 on the second end face wall 26, the liquid surface of the first liquid 14 can smoothly move on the water-repellent film 36, thus increasing the operation speed of the diaphragm.

Next, a change in the shape of the interface 48 of the first liquid 14 and the second liquid 16 will be described in detail.

When a voltage V is applied between the first electrode 18 and the second electrode 20 and an angle formed by the interface 48 between the first liquid 14 and the second liquid 16 is defined as the angle of contact θ, as shown in FIGS. 4A to 4C, the angle of contact θ is represented by formula (1):

$$\cos\theta(V) = \cos\theta(V=0) + \in_0 \times \in_r \times V^2 / 2\gamma t \quad (1)$$

wherein cos θ(V) represents the angle of contact when an applied voltage is V [V], cos θ(V=0) represents the angle of contact when no voltage is applied, $\in_0$ represents the dielectric constant in vacuum of $8.85 \times 10^{-12}$ [F/m], $\in_r$ represents the relative dielectric constant of the insulating film 32, V represents the applied voltage [V], t represents the thickness [m] of the insulating film 32, and γ represents interfacial tension (or interfacial energy) [N/m] between the first liquid 14 and the second liquid 16.

More specifically, the angle of contact θ is increased or decreased (the wettability of the first liquid 14 is changed) by increasing or decreasing the voltage V, thereby changing a force for pushing the second liquid 16 by the first liquid 14. As a result, the shape of the interface 48 is changed.

The optical element 10 is used in an imaging optical system of an image-pickup apparatus such as a digital still camera, a video camera, or the like.

FIG. 5 is a schematic view showing an example in which the optical element 10 is applied to an imaging optical system of an image-pickup apparatus.

As shown in FIG. 5, an image-pickup apparatus 100 includes an image-pickup device 102 for capturing an image of an object, and an imaging optical system 104 for leading the image of the object to the image-pickup device 102.

On an optical axis L of the imaging optical system 104, from the object to the image-pickup device 102, a first lens unit 106, a second lens unit 108, a third lens unit 110, a fourth lens unit 112, and a filter unit 114 are arranged in that order.

In this example, the first lens unit 106 and the third lens unit 110 are provided so as not to be movable in the optical axis direction. The second lens unit 108 is provided as a zoom lens so as to be movable in the optical axis direction. The fourth lens unit 112 is provided as a focus lens so as to be movable in the optical axis direction.

A beam of light from the object led by the first lens unit 106 is converted to a parallel beam of light by the second lens unit 108. The parallel beam of light is led to the third lens unit 110 and converged on an image-pickup surface 102A of the image-pickup device 102 through the fourth lens unit 112 and the filter unit 114.

The optical element 10 is arranged at a position between the second lens unit 108 and the third lens unit 110, through which the parallel beam of light passes, so that the position of a virtual axis 38 corresponds to the optical axis L of the imaging optical system 104.

Accordingly, by expanding or contracting the light transmission path 52 (aperture 52A) of the optical element 10, the amount of beam of light led to the image-pickup surface 102A is increased or decreased.

In the above-described basic structure of the optical element 10, in addition to the first electrode 18 and the second electrode 20, for example, the insulating film 32 for providing the first liquid 14 with an electric field, and the hydrophilic film 34 and the water-repellent film 36 for increasing the moving speed of the interface 48 between the first liquid 14 and the second liquid 16 are provided on the first end face wall 24 and the second end face wall 26 through which light is transmitted. Therefore, this basic structure is disadvantageous from the standpoint that transparency of the optical element 10 is improved.

Consequently, in the first embodiment, transparency of the optical element 10 is improved by forming an opening through the first electrode 18, the second electrode 20, the insulating film 32, and the water-repellent film 36.

The first electrode 18, the second electrode 20, the insulating film 32, and the water-repellent film 36, which include a feature of an embodiment of the present invention will now be described in detail.

FIG. 6 is a longitudinal cross-sectional view showing the structure of an optical element 10 according to the first embodiment.

In embodiments described below, the same portions and components as the above-described basic structure are assigned the same reference numerals, and a description thereof is omitted.

The optical element 10 of the first embodiment is the same as the optical element having the above-described basic structure except for the first electrode 18, the second electrode 20, the insulating film 32, and the water-repellent film 36.

As shown in FIG. 6, when the optical element 10 is viewed from the thickness direction of the container 12, a first electrode opening 40 is provided in the first electrode 18, a second electrode opening 42 is provided in the second electrode 20, an insulating film opening 44 is provided in the insulating film 32, and a water-repellent film opening 46 is provided in the water-repellent film 36.

It is sufficient that the first electrode opening 40 is formed so as to have a size with which an electric field can be applied to the first liquid 14 using the first electrode 18. Accordingly, the first electrode opening 40 has a diameter the same as or larger than the maximum diameter Dmax of the transmission path 52, the center of which is a virtual axis 38.

The first electrode 18 is provided over the entire area on the inner surface of the first end face wall 24 except for the first electrode opening 40.

It is sufficient that the second electrode opening 42 and the insulating film opening 44 are formed so as to have sizes with which an electric field can be applied to the first liquid 14 using the second electrode 20 and the insulating film 32. Accordingly, the second electrode opening 42 and the insulating film opening 44 are formed so as to have the same diameter as the maximum diameter Dmax of the transmission path 52, the center of which is the virtual axis 38.

Here, when both the second electrode opening 42 and the insulating film opening 44 are formed, and the size of the second electrode opening 42 is the same as the maximum diameter Dmax of the transmission path 52, the insulating film opening 44 is formed so as to have a size the same as or smaller than the second electrode opening 42.

That is, in a state where the second electrode opening 42 has the maximum diameter Dmax of the transmission path 52, if the first liquid 14 contacts the second electrode 20 through the second electrode opening 42, the first electrode 18 and the second electrode 20 are short-circuited via the first liquid 14. For this reason, in order to insulate the first liquid 14 from the second electrode 20 with the insulating film 32 therebetween even in the case of the maximum diameter Dmax of the transmission path 52, the insulating film opening 44 is formed so as to have a size the same as or smaller than the second electrode opening 42.

It is sufficient that the water-repellent film opening 46 is formed so as to have a size in which the first liquid 14 can contact the water-repellent film 36. Accordingly, the water-repellent film opening 46 is formed so as to have the same diameter as the maximum diameter Dmax of the transmission path 52, the center of which is the virtual axis 38.

Next, the operation and advantages of the optical element 10 will be described with reference to FIGS. 4A, 4B, and 4C again.

When a voltage is applied from the voltage applying unit 22 to the first electrode 18 and the second electrode 20 to change the shape of the interface 48, thereby expanding or contracting the aperture diameter, the diameter of the transmission path 52 formed by a portion of the second liquid 16 also increases or decreases in the range of D1 to Dmax.

In this case, regardless of the size of the diameter of the transmission path 52, light incident from the incident surface of the optical element 10 passes through the first end face wall 24, and then passes through the first electrode opening 40, the portion of the second liquid 16, the water-repellent film opening 46, the insulating film opening 44, the second electrode opening 42, and the second end face wall 26 in that order.

Accordingly, in terms of the structure, the above-described optical element having the basic structure is disadvantageous in that transparency of the optical element decreases because light passes through four portions of the first electrode 18, the water-repellent film 36, the insulating film 32, and the second electrode 20. In contrast, in this embodiment, light passes through the optical element without passing through the four portions of the first electrode 18, the water-repellent film 36, the insulating film 32, and the second electrode 20. Accordingly, this optical element is advantageous in the improvement of transparency. It is expected that the transmittance of the optical element 10 of this embodiment can be improved by 3% to 10% relative to that of the optical element having the basic structure.

In this embodiment, a description has been made of a structure in which four openings of the first electrode opening 40, the water-repellent film opening 46, the insulating film opening 44, and the second electrode opening 42 are provided. Alternatively, among the following four types of structures, one structure may be selected or two or more structures may be combined. However, the combination of (3) and (4) is excluded.

(1) The first electrode opening 40 is provided.
(2) The water-repellent film opening 46 is provided.
(3) Both the insulating film opening 44 and the second electrode opening 42 are provided.
(4) The second electrode opening 42 is provided.

However, as in this embodiment, the structure including four openings of the first electrode opening 40, the water-repellent film opening 46, the insulating film opening 44, and the second electrode opening 42 is the most advantageous from the standpoint of improving the transparency (transmittance) of the optical element 10.

In this embodiment, a description has been made of a case where the diameter of the second electrode opening 42 and the diameter of the insulating film opening 44 are the same as the maximum diameter Dmax of the transmission path 52. However, it is sufficient that the second electrode opening 42 and the insulating film opening 44 are formed so as to have sizes with which an electric field can be applied to the first liquid 14 using the second electrode 20 and the insulating film 32. Accordingly, the diameter of the second electrode opening 42 and the diameter of the insulating film opening 44 may be smaller than the maximum diameter Dmax. However, as in this embodiment, when the diameter of the second electrode opening 42 and the diameter of the insulating film opening 44 are the same as the maximum diameter Dmax of the transmission path 52, this structure is more advantageous in that transparency of the optical element 10 is ensured.

Furthermore, in this embodiment, a description has been made of a case where the diameter of the water-repellent film opening 46 is the same as the maximum diameter Dmax of the transmission path 52. However, it is sufficient that the water-repellent film opening 46 is formed so as to have a size with which the first liquid 14 contacts the water-repellent film 36. Accordingly, the diameter of the water-repellent film opening 46 may be smaller than the maximum diameter Dmax. However, as in this embodiment, when the diameter of the water-repellent film opening 46 is same as the maximum diameter Dmax of the transmission path 52, this structure is more advantageous in that transparency of the optical element 10 is ensured.

In addition, in this embodiment, a case where the water-repellent film 36 is provided has been described. Alternatively, the water-repellent film 36 may be omitted. However, the formation of the water-repellent film 36 is advantageous in that the operation speed of the diaphragm is increased.

Second Embodiment

Next, a second embodiment will be described.

Figure 7:
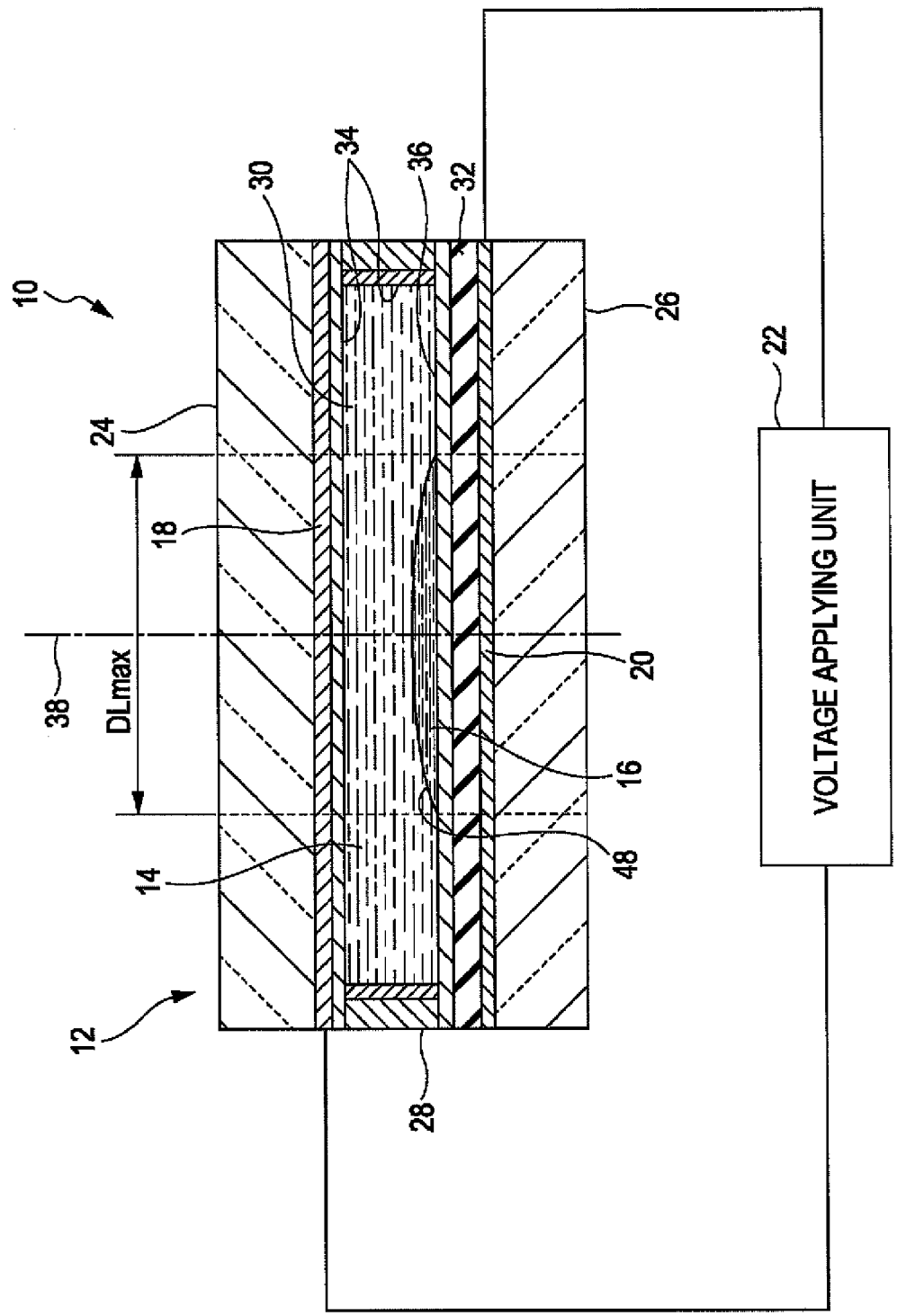
FIG. 7 is a longitudinal cross-sectional view showing the basic structure of an optical element 10 according to a second embodiment.

FIG. 7 is a longitudinal cross-sectional view showing the basic structure of an optical element 10 according to the second embodiment.

The second embodiment differs from the first embodiment and third to tenth embodiments in that the optical element 10 constitutes a lens.

The basic structure of the optical element 10 of the second embodiment is substantially the same as the first embodiment except that the compositions of the first liquid 14 and the second liquid 16 are different from those in the first embodiment. Therefore, structures different from the first embodiment will be mainly described below.

In the optical element 10, an interface 48 between the first liquid 14 and the second liquid 16 is changed by applying a voltage with a voltage applying unit 22. Thereby, the interface 48 which has a curved surface and the center of which is a single virtual axis 38 passing through a first end face wall 24 and a second end face wall 26 and extending in the thickness direction of a container 12, which is a direction in which the first end face wall 24 and the second end face wall 26 face each other, is formed to refract light traveling in the direction of the virtual axis 38 and passing through the interface 48.

As in the first embodiment, the optical element 10 includes the container 12, the first liquid 14, the second liquid 16, a first electrode 18, a second electrode 20, and the voltage applying unit 22.

The first liquid 14 has polarity or electrical conductivity and is enclosed in an accommodating chamber 30.

The second liquid 16 is immiscible with the first liquid 14 and is enclosed in the accommodating chamber 30.

The first liquid 14 and the second liquid 16 are transparent and have specific gravities substantially the same as each other.

The refractive index of the second liquid 16 is different from the refractive index of the first liquid 14. In this embodiment, the optical element 10 is configured so that the refractive index of the second liquid 16 is higher than the refractive index of the first liquid 14.

Alternatively, the optical element 10 of this embodiment is configured so that the Abbe number of the second liquid 16 is different from the Abbe number of the first liquid 14.

Alternatively, the optical element 10 of this embodiment is configured so that the refractive index of the second liquid 16 is different from the refractive index of the first liquid 14, and in addition, the Abbe number of the second liquid 16 is different from the Abbe number of the first liquid 14.

Next, the operation of the optical element 10 will be described.

Figure 8A:
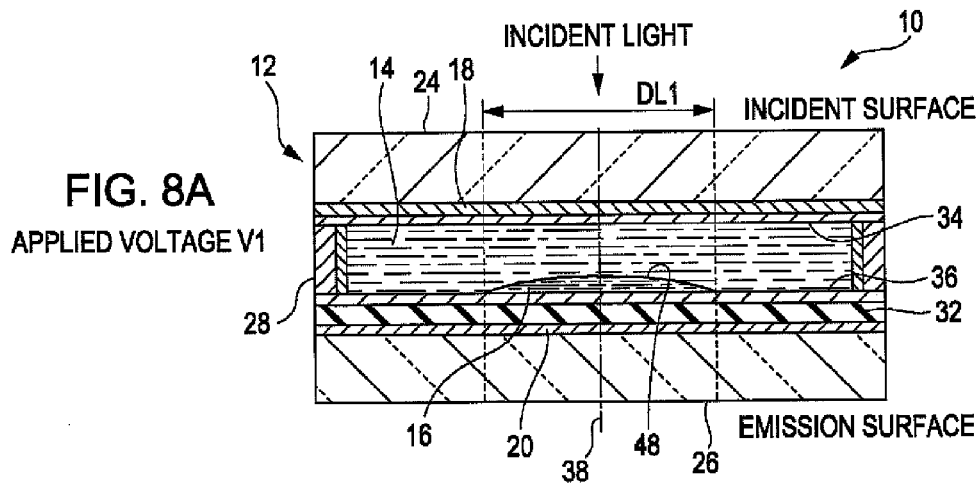
FIGS. 8A, 8B, and 8C are cross-sectional views illustrating an operation when voltages V1, V2, and V3 are applied between a first electrode 18 and a second electrode 20 of the optical element 10, respectively.
Figure 8B:
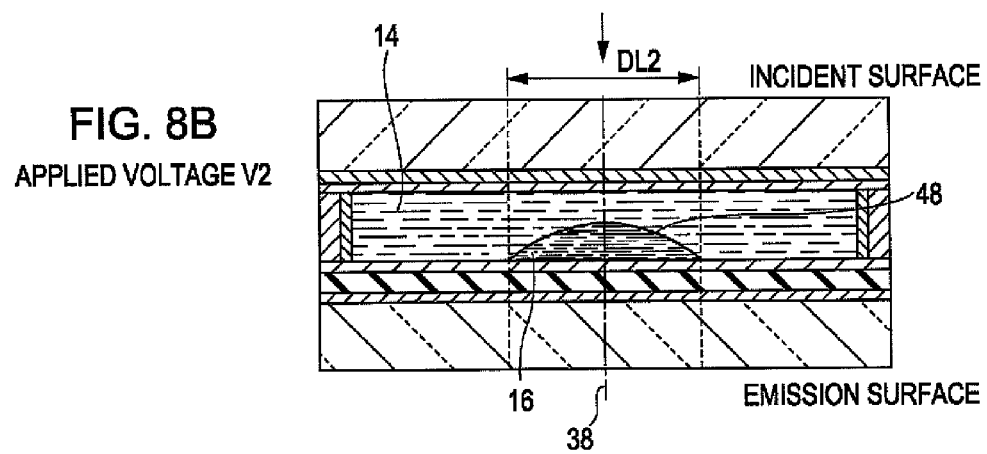
Figure 8C:
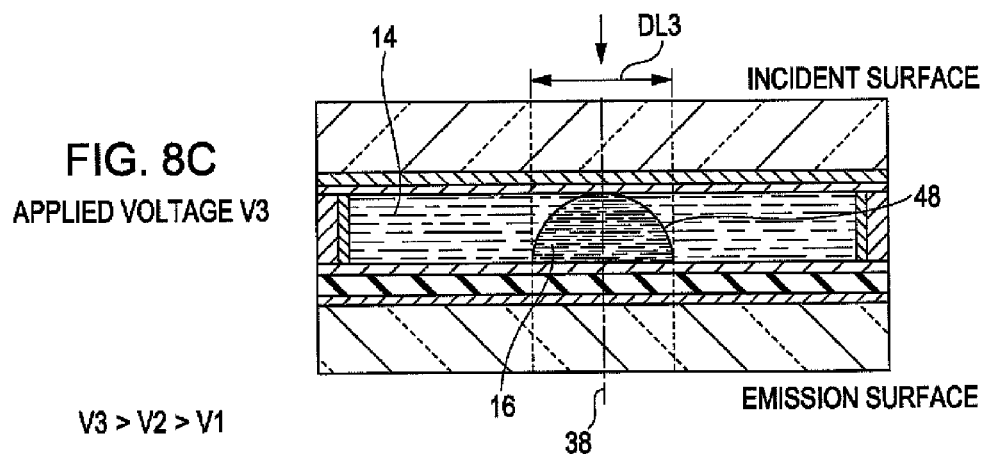

FIGS. 8A, 8B, and 8C are cross-sectional views illustrating an operation when voltages V1, V2, and V3 are applied between the first electrode 18 and the second electrode 20 of the optical element 10, respectively.

As shown in FIG. 7, in a state in which no voltage V is applied from the voltage applying unit 22 to the first electrode 18 and the second electrode 20, the shape of the interface 48 between the first liquid 14 and the second liquid 16 is determined by a balance between surface tensions of the first liquid 14 and the second liquid 16 and interfacial tension on a water-repellent film 36. In this state, the interface 48 forms a gradual convex surface projecting from the second liquid 16 toward the first liquid 14.

Here, since the refractive index of the second liquid 16 is higher than the refractive index of the first liquid 14, light passing through the first end face wall 24 and the second end face wall 26, traveling in the thickness direction of the container 12, and passing through the interface 48 is refracted at the interface 48. Accordingly, the optical element 10 constitutes a lens having a power for converging light.

Here, when the optical element 10 is viewed from the thickness direction of the container 12, the diameter of the interface 48, the center of which is the virtual axis 38 is a maximum diameter DLmax.

Next, as shown in FIG. 8A, when a voltage V1 (>0) is applied from the voltage applying unit 22 to the first electrode 18 and the second electrode 20, the slope of the curvature of the convex surface (spherical surface) of the interface 48 is increased by electrocapillarity.

Here, when the optical element 10 is viewed from the thickness direction of the container 12, the diameter DL1 of the interface 48, the center of which is the virtual axis 38, is smaller than the maximum diameter DLmax (DL1<DLmax).

Next, as shown in FIG. 8B, when a voltage V2 (>V1) is applied from the voltage applying unit 22 to the first electrode 18 and the second electrode 20, the slope of the curvature of the convex surface (spherical surface) of the interface 48 is further increased.

Here, when the optical element 10 is viewed from the thickness direction of the container 12, the diameter DL2 of the interface 48, the center of which is the virtual axis 38, is smaller than DL1 (DL2<DL1).

Next, as shown in FIG. 8C, when a voltage V3 (>V2) is applied from the voltage applying unit 22 to the first electrode 18 and the second electrode 20, the slope of the curvature of the convex surface (spherical surface) of the interface 48 is further increased and becomes the maximum slope.

Here, when the optical element 10 is viewed from the thickness direction of the container 12, the diameter DL3 of the interface 48, the center of which is the virtual axis 38, is smaller than DL2 (DL3<DL2).

Accordingly, by adjusting the voltage applied from the voltage applying unit 22 to the first electrode 18 and the second electrode 20, the curvature of the interface 48 is changed, and thus the focal length of the lens can be changed (the power of the lens can be changed).

In addition, by adjusting the voltage applied from the voltage applying unit 22 to the first electrode 18 and the second electrode 20, when the optical element 10 is viewed from the thickness direction of the container 12, the diameter of the interface 48, the center of which is the virtual axis 38, is increased or decreased in the range of DL3 to the maximum diameter DLmax.

As described above, as in the first embodiment, the optical element 10 constituting a lens can be used in an imaging optical system of an image-pickup apparatus such as a digital still camera, a video camera, or the like.

Next, the first electrode 18, the second electrode 20, an insulating film 32, and the water-repellent film 36, which include a feature of this embodiment will be described in detail.

FIG. 9 is a longitudinal cross-sectional view showing the structure of the optical element 10 according to the second embodiment.

As shown in FIG. 9, when the optical element 10 is viewed from the thickness direction of the container 12, a first electrode opening 40 is provided in the first electrode 18, a second electrode opening 42 is provided in the second electrode 20, an insulating film opening 44 is provided in the insulating film 32, and a water-repellent film opening 46 is provided in the water-repellent film 36.

It is sufficient that the first electrode opening 40 is formed so as to have a size with which an electric field can be applied to the first liquid 14 using the first electrode 18. Accordingly, the first electrode opening 40 has a diameter the same as or larger than the maximum diameter DLmax of the interface 48, the center of which is a virtual axis 38.

The first electrode 18 is provided on the entire area of the inner surface of the first end face wall 24 except for the first electrode opening 40.

It is sufficient that the second electrode opening 42 and the insulating film opening 44 are formed so as to have sizes with which an electric field can be applied to the first liquid 14 using the second electrode 20 and the insulating film 32. Accordingly, the second electrode opening 42 and the insulating film opening 44 are formed so as to have the same diameter as the maximum diameter DLmax of the interface 48, the center of which is the virtual axis 38.

Here, when both the second electrode opening 42 and the insulating film opening 44 are formed, and the size of the second electrode opening 42 is the same as the maximum diameter DLmax of the interface 48, the insulating film opening 44 is formed so as to have a size the same as or smaller than the second electrode opening 42.

That is, in a state where the interface 48 has the maximum diameter DLmax, if the first liquid 14 contacts the second electrode 20 through the second electrode opening 42, the first electrode 18 and the second electrode 20 are short-circuited via the first liquid 14. For this reason, in order to insulate the first liquid 14 from the second electrode 20 with the insulating film 32 therebetween even in the case where the interface 48 has the maximum diameter DLmax, the insulating film opening 44 is formed so as to have a size the same as or smaller than the second electrode opening 42.

It is sufficient that the water-repellent film opening 46 is formed so as to have a size with which the first liquid 14 can contact the water-repellent film 36. Accordingly, the water-repellent film opening 46 is formed so as to have the same diameter as the maximum diameter DLmax of the interface 48, the center of which is the virtual axis 38.

Next, the operation and advantages of the optical element 10 will be described with reference to FIG. 7 and FIGS. 8A, 8B, and 8C again.

When the shape of the interface 48 is changed by applying a voltage from the voltage applying unit 22 to the first electrode 18 and the second electrode 20 from a state where no voltage is applied, the diameter of the interface 48 also increases or decreases in the range of DLmax to DL3.

In this case, regardless of an increase or decrease in the diameter of the interface 48, among light components incident from the incident surface of the optical element 10, light components passing through the interface 48 pass through the first end face wall 24, and then pass through the first electrode opening 40, the portion of the second liquid 16, the water-repellent film opening 46, the insulating film opening 44, the second electrode opening 42, and the second end face wall 26 in that order.

Accordingly, in terms of the structure, the above-described optical element having the basic structure is disadvantageous in that transparency of the optical element decreases because light passes through four portions of the first electrode 18, the water-repellent film 36, the insulating film 32, and the second electrode 20. In contrast, in this embodiment, light passes through the optical element without passing through the four portions of first electrode 18, the water-repellent film 36, the insulating film 32, and the second electrode 20. Accordingly, this optical element is advantageous in the improvement of transparency. It is expected that the transmittance of the optical element 10 of this embodiment can be improved by 3% to 10% relative to that of the optical element having the basic structure.

In this embodiment, a description has been made of a structure in which four openings of the first electrode opening 40, the water-repellent film opening 46, the insulating film opening 44, and the second electrode opening 42 are provided. Alternatively, among the following four types of structures, one structure may be selected or two or more structures may be combined. However, the combination of (3) and (4) is excluded.

(1) The first electrode opening 40 is provided.

(2) The water-repellent film opening 46 is provided.

(3) Both the insulating film opening 44 and the second electrode opening 42 are provided.

(4) The second electrode opening 42 is provided.

However, as in this embodiment, the structure including four openings of the first electrode opening 40, the water-repellent film opening 46, the insulating film opening 44, and the second electrode opening 42 is the most advantageous from the standpoint of improving the transparency (transmittance) of the optical element 10.

In this embodiment, a description has been made of a case where the diameter of the second electrode opening 42 and the diameter of the insulating film opening 44 are the same as the maximum diameter DLmax of the interface 48. However, it is sufficient that the second electrode opening 42 and the insulating film opening 44 are formed so as to have sizes with which an electric field can be applied to the first liquid 14 using the second electrode 20 and the insulating film 32. Accordingly, the diameter of the second electrode opening 42 and the diameter of the insulating film opening 44 may be smaller than the maximum diameter DLmax. However, as in this embodiment, when the diameter of the second electrode opening 42 and the diameter of the insulating film opening 44 are the same as the maximum diameter DLmax of the interface 48, this structure is more advantageous in that transparency of the optical element 10 is ensured.

Furthermore, in this embodiment, a description has been made of a case where the diameter of the water-repellent film opening 46 is the same as the maximum diameter DLmax of the interface 48. However, it is sufficient that the water-repellent film opening 46 is formed so as to have a size with which the first liquid 14 contacts the water-repellent film 36. Accordingly, the diameter of the water-repellent film opening 46 may be smaller than the maximum diameter DLmax. However, as in this embodiment, when the diameter of the water-repellent film opening 46 is same as the maximum diameter DLmax of the interface 48, this structure is more advantageous in that transparency of the optical element 10 is ensured.

In addition, in this embodiment, a case where the water-repellent film 36 is provided has been described. Alternatively, the water-repellent film 36 may be omitted. However, the formation of the water-repellent film 36 is advantageous in that the operation speed of the lens is increased.

Third Embodiment

Next, a third embodiment will be described.

The third embodiment is a modification of the first embodiment. The shape of a second electrode 20 of the third embodiment differs from the shape of the second electrode 20 of the first embodiment.

Figure 10:
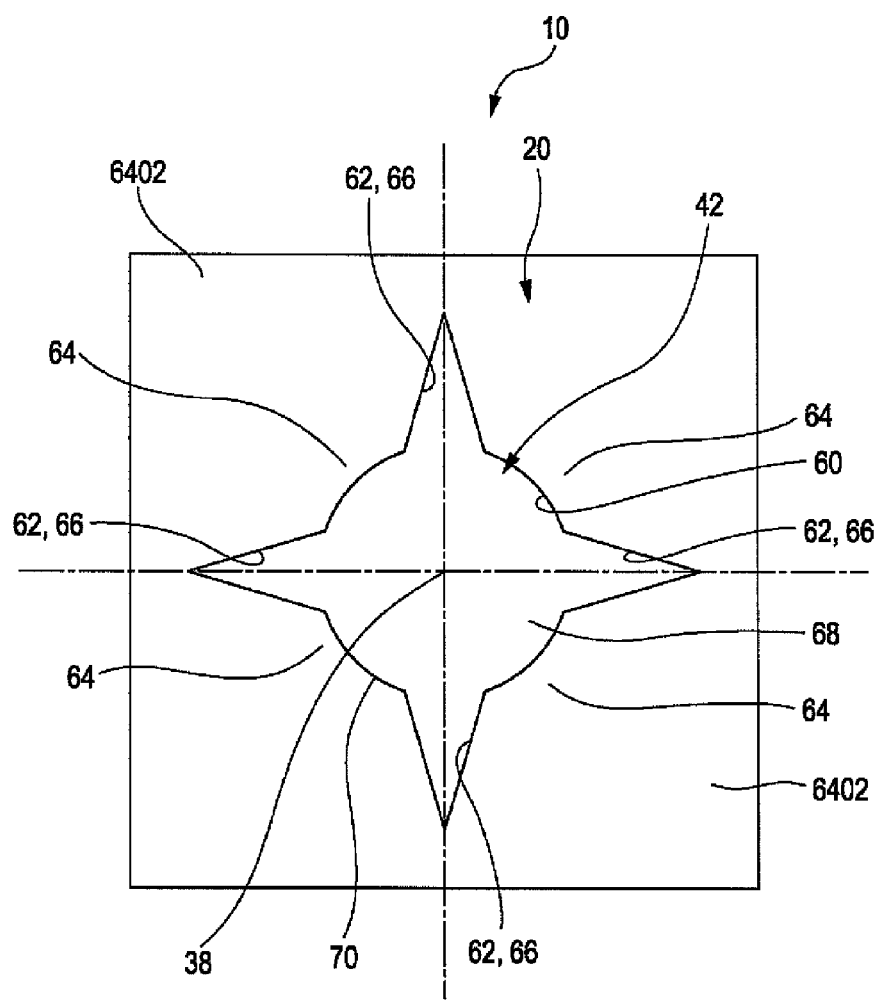
FIG. 10 is a plan view of a second electrode 20 of an optical element 10 according to a third embodiment.

FIG. 10 is a plan view of the second electrode 20 of an optical element 10 according to the third embodiment.

As shown in FIG. 10, a second electrode opening 42 includes a circular portion 60, the center of which is a virtual axis 38, and a plurality of projecting portions 62 projecting from portions disposed on the outer circumference of the circular portion 60 at intervals in the circumferential direction toward the outside in the radial direction.

Each of the projecting portions 62 has a width in a direction orthogonal to the direction in which the projecting portions 62 project, and is configured so that the width tapers as the projecting portions 62 extend toward the outside in the radial direction.

That is, the second electrode 20 is composed of a plurality of electrode portions 64 which extend in the radial direction and the center of which is a single virtual axis 38 extending in the thickness direction of a container 12.

In this embodiment, the second electrode 20 is composed of four electrode portions 64 having the same shape and the same size, and portions 6402 disposed outside of the electrode portions 64 are connected to each other. Accordingly, a voltage is uniformly applied throughout the second electrode 20 by the voltage applying unit 22, that is, the same voltage is applied to each of the electrode portions 64.

Each of the projecting portions 62 is disposed between electrode portions 64 adjacent to each other in the circumferential direction around the virtual axis 38, and each of the projecting portions 62 constitutes a first non-electrode portion 66 in which the electrode portion 64 is not formed.

In this embodiment, four first non-electrode portions 66 having the same shape and the same size are provided.

Each of the electrode portions 64 and each of the first non-electrode portions 66 have a width in the circumferential direction of the virtual axis 38. Each of the electrode portions 64 is formed so that the width of the electrode portion 64 diverges toward the outside in the radial direction of a circle, the center of which is the virtual axis 38. Each of the first non-electrode portions 66 is formed so that the width of the first non-electrode portion 66 tapers toward the outside in the radial direction.

In addition, on a single circumference, the center of which is the virtual axis 38, the width of each of the electrode portions 64 is larger than the width of the first non-electrode portion 66.

In this embodiment, each of the electrode portions 64 extends in the form of a fan shape to the outside in the radial direction with respect to the virtual axis 38 functioning as the center. Each of the first non-electrode portions 66 extends in the form of an isosceles triangle so that the width of the first non-electrode portion 66 tapers toward the outside in the radial direction. The end of each of the first non-electrode portions 66 is located on a single virtual circle, the center of which is the virtual axis 38.

Furthermore, in this embodiment, the circular portion 60 is located in a substantially circular area, the center of which is the virtual axis 38, and the circular portion 60 constitutes a second non-electrode portion 68 in which the electrode portion 64 is not formed.

Each of the electrode portions 64 is provided outside in the radial direction of the second non-electrode portion 68. The inner peripheral portion of the radial direction of each of the electrode portions 64 extends on a single virtual circle, the center of which is the virtual axis 38.

The first non-electrode portions 66 are provided so as to project from portions disposed on the outer circumference of the second non-electrode portion 68 at intervals in the circumferential direction toward the outside in the radial direction of the second non-electrode portion 68. Each of the first non-electrode portions 66 is connected to the outer circumference of the second non-electrode portion 68.

Accordingly, a circular-arc portion 70 is formed at the boundary between the inner circumference of each of the electrode portions 64 and the outer circumference of the second non-electrode portion 68.

Next, a change in the shape of the interface 48 between the first liquid 14 and the second liquid 16 will be described with reference to FIGS. 4A to 4C again.

First, as shown in FIG. 4A, a description will be made of a case where a voltage V1 (>0) is applied from the voltage applying unit 22 to the first electrode 18 and the second electrode 20.

Figure 11:
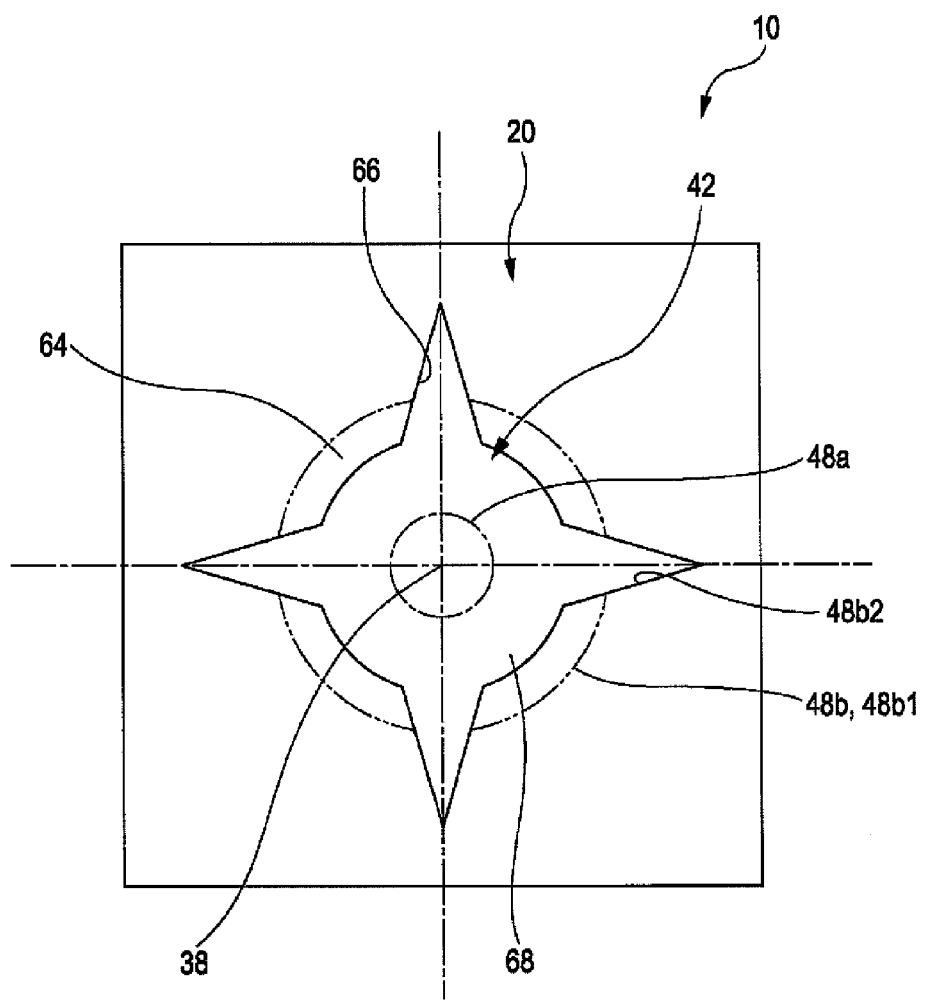
FIG. 11 is a plan view of the optical element 10.

FIG. 11 is a plan view of FIG. 4A. In FIG. 11, the one-dot chain line indicates an interface 48*a* on the first end face wall 24, and the two-dot chain line indicates an interface 48*b* on the second end face wall 26.

Figure 12:
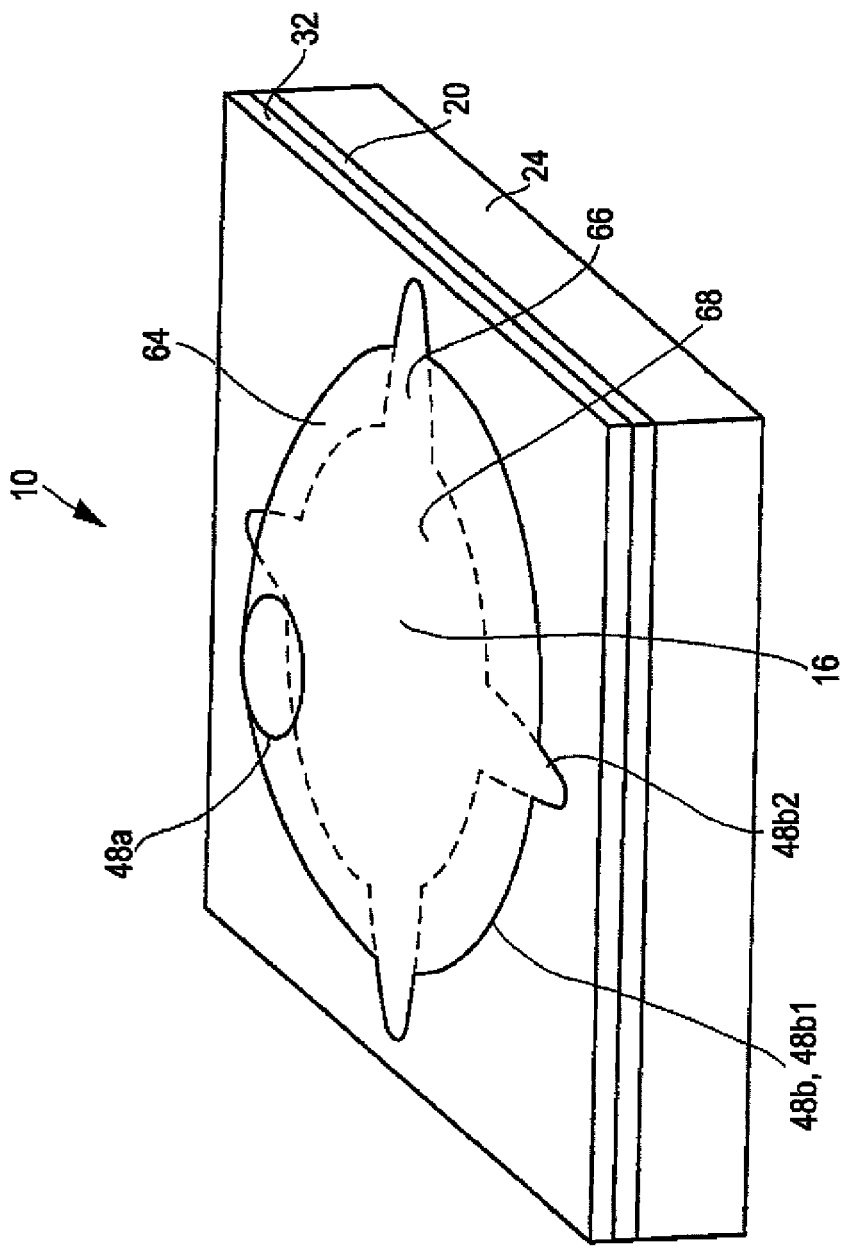
FIG. 12 is a schematic perspective view showing the shape of a second liquid 16 in FIG. 4A.

FIG. 12 is a schematic perspective view showing the shape of the second liquid 16 in FIG. 4A.

As shown in FIGS. 11 and 12, on the first end face wall 24, the interface 48*a* has a substantially circular shape, the center of which is the virtual axis 38.

On the second end face wall 26, the interface 48*b* is composed of four arcuate portions 48*b*1 and four protruding portions 48*b*2. The arcuate portions 48*b*1 extend on a circumference disposed outside in the radial direction of the second non-electrode portion 68, the center of which is the virtual axis 38. Each of the protruding portions 48*b*2 connects adjacent arcuate portions 48*b*1 and protrudes from the circumference formed by the arcuate portions 48*b*1 to the outside in the radial direction.

Next, as shown in FIG. 4B, a detailed description will be made of a case where a voltage V2 (>V1) is applied from the voltage applying unit 22 to the first electrode 18 and the second electrode 20.

Figure 13:
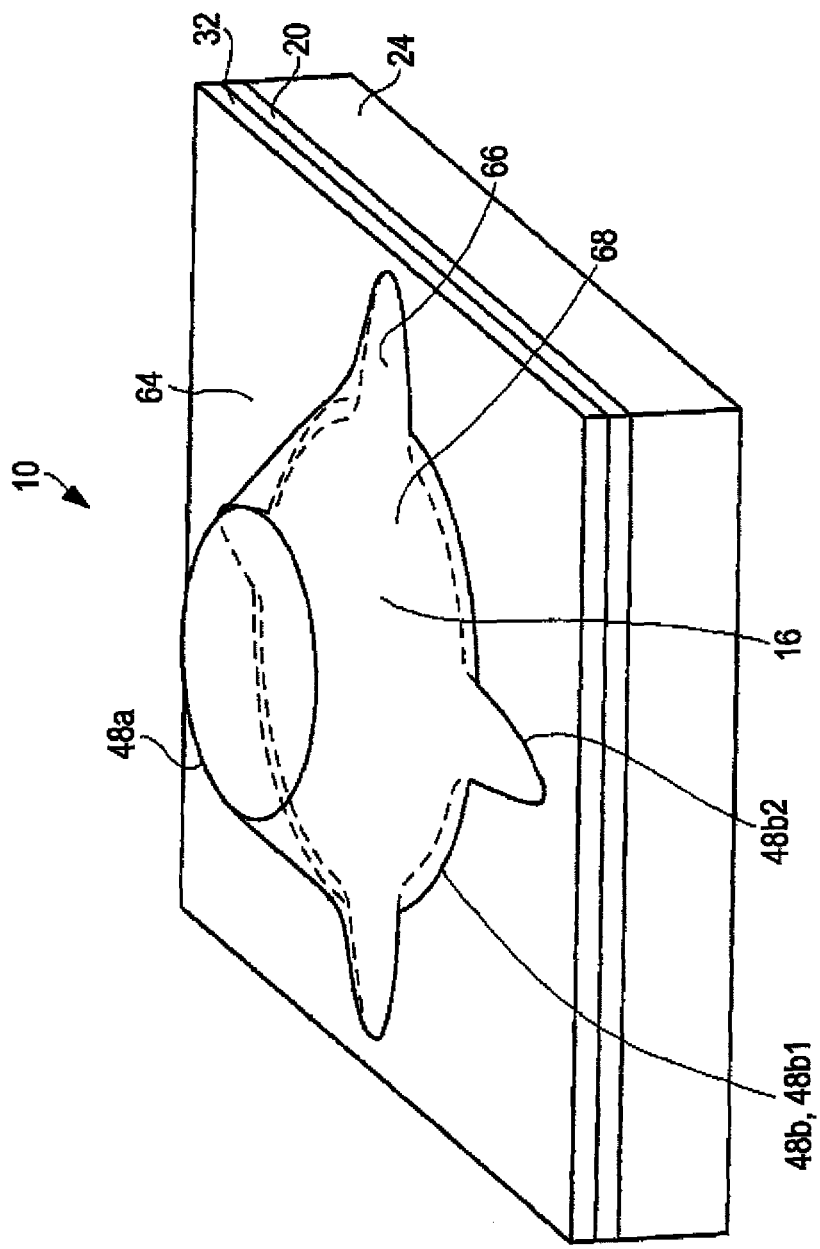
FIG. 13 is a schematic perspective view showing the shape of the second liquid 16 in FIG. 4B.

FIG. 13 is a schematic perspective view showing the shape of the second liquid 16 in FIG. 4B.

As shown in FIG. 13, the second liquid 16 is pushed by the first liquid 14. As a result, the diameter of the interface 48*a* on the first end face wall 24 is increased, and the interface 48*b* on the second end face wall 26 is receded to a position near the outline of the first non-electrode portions 66 and the second non-electrode portion 68.

Next, as shown in FIG. 4C, a detailed description will be made of a case where a voltage V3 (>V2) is applied from the voltage applying unit 22 to the first electrode 18 and the second electrode 20.

Figure 14:
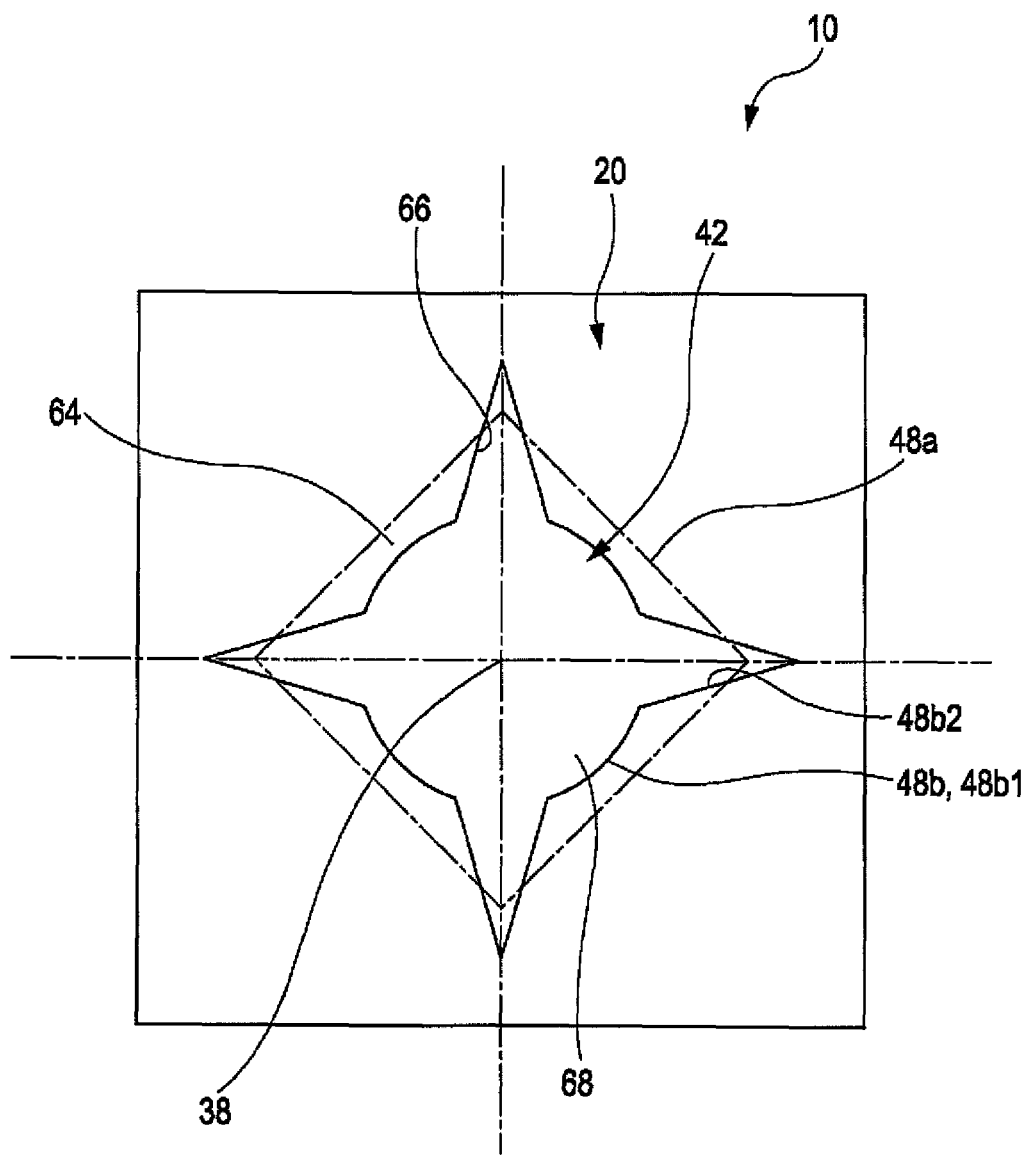
FIG. 14 is a plan view of FIG. 4C.

FIG. 14 is a plan view of FIG. 4C.

As shown in FIG. 14, the second liquid 16 is further pushed by the first liquid 14. As a result, the diameter of the interface 48*a* on the first end face wall 24 is increased to the maximum diameter, and the interface 48*b* on the second end face wall 26 is receded to a position corresponding to the outline of the first non-electrode portions 66 and the second non-electrode portion 68.

In this case, on the second end face wall 26, the second liquid 16 extends on the entire area of the first non-electrode portions 66 and the second non-electrode portion 68.

Accordingly, four arms composed of the second liquid 16 project from the outer circumference of a portion of the second liquid 16 located on the second non-electrode portion 68 to the outside in the radial direction of the second non-electrode portion 68 along each of the first non-electrode portions 66. Therefore, the shape of the outer periphery of the central portion (the portion located on the second electrode opening 42) of the second liquid 16 is changed by being pulled by the four arm portions.

As a result, the shape of the interface 48*a* on the first end face wall 24 becomes a substantially rectangular shape in which four corners are located on the first non-electrode portions 66.

As described above, the angle of contact (the wettability) of the first liquid 14 is changed by a voltage applied to the first liquid 14. As a result, the first liquid 14 moves to push the second liquid 16. Accordingly, on the second end face wall 26, the interface 48 moves only on the electrode portions 64 to which the voltage is applied, and does not move on the first non-electrode portions 66 or the second non-electrode portion 68 to which no voltage is applied.

That is, on the second end face wall 26, the second liquid 16 is constantly disposed on the first non-electrode portions 66 and the second non-electrode portion 68. In addition, as the first liquid 14 moves toward the outside in the radial direction of the second non-electrode portion 68, the second liquid 16 moves so as to extend from the first non-electrode portions 66 and the second non-electrode portion 68 to the electrode portions 64.

As described above, by increasing or decreasing the voltage applied between the first electrode 18 and the second electrode 20 in the range of V1 to V3, the shape of the interface 48 is changed and the aperture diameter is changed from D1 to D3. In this case, regardless of the change in the voltage applied between the first electrode 18 and the second electrode 20, the center of the light transmission path 52 (aperture 52A) shown in FIGS. 4A to 4C constantly corresponds to the virtual axis 38. Even if the center of the light transmission path 52 deviates from the virtual axis 38 and decentering occurs, the position of the center of the light transmission path 52 is automatically recovered so as to correspond to the position of the virtual axis 38. This phenomenon will now be described in detail.

Figure 15:
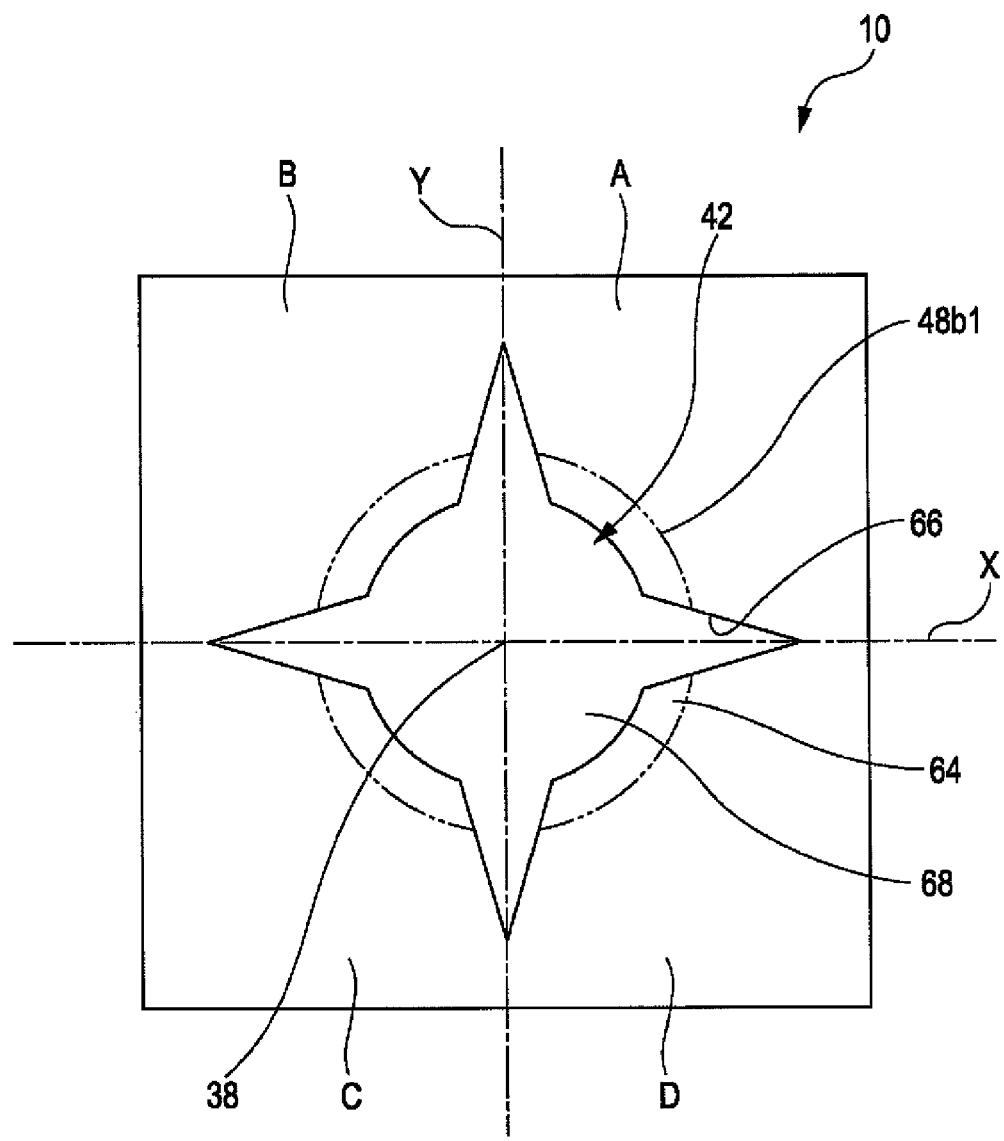
FIG. 15 is a view illustrating a state in which the center of a light transmission path 52 corresponds to a virtual axis 38.
Figure 16:
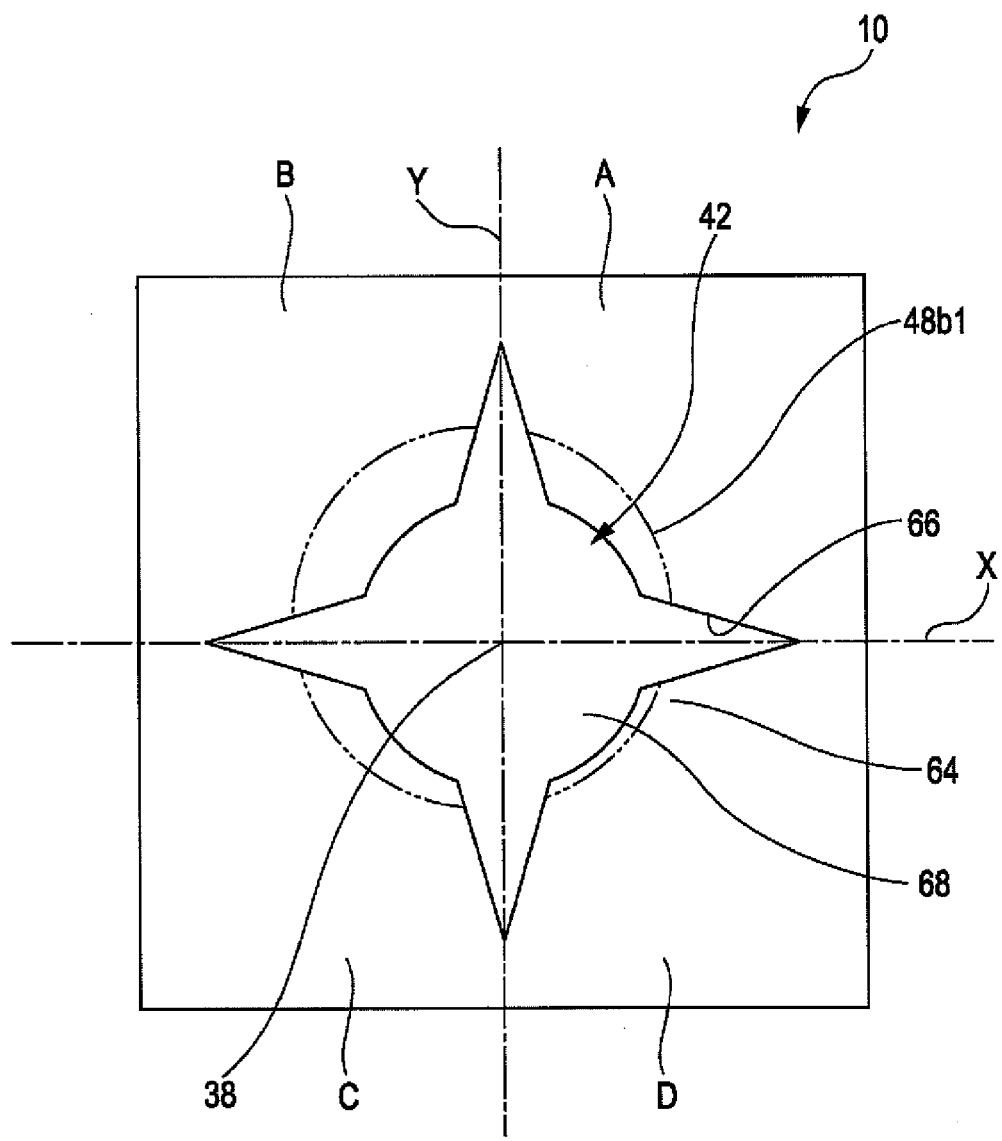
FIG. 16 is a view illustrating a state in which the center of the light transmission path 52 deviates from the virtual axis 38 and becomes decentered.
Figure 17:
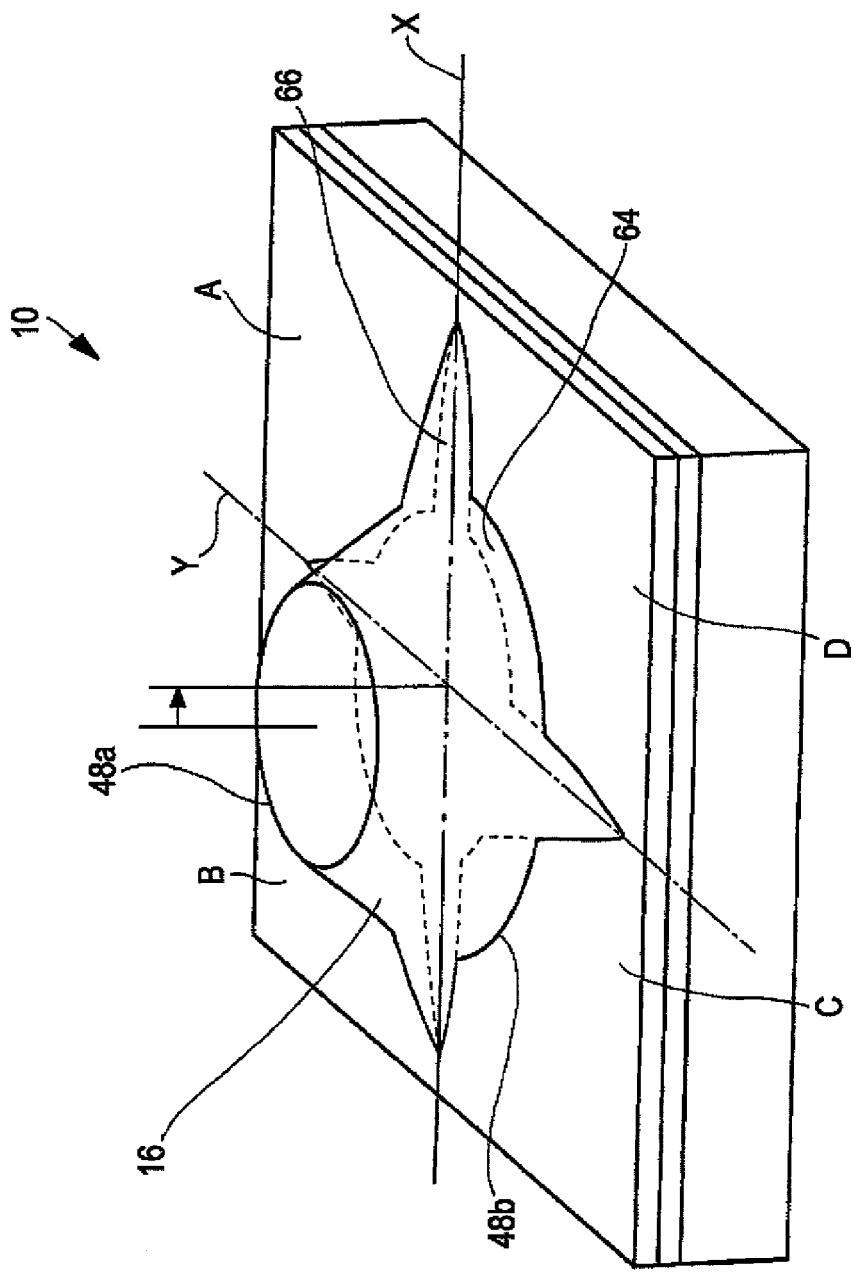
FIG. 17 is a perspective view of FIG. 16.

FIG. 15 is a view illustrating a state in which the center of the light transmission path 52 corresponds to the virtual axis 38. FIG. 16 is a view illustrating a state in which the center of the light transmission path 52 deviates from the virtual axis 38 and becomes decentered. FIG. 17 is a perspective view of FIG. 16.

In FIGS. 15, 16, and 17, for convenience of explanation, four quadrants separated by two coordinate axes which are orthogonal to the virtual axis 38 on the insulating film 32, which is orthogonal to the virtual axis 38, and which are orthogonal to each other are defined as a first quadrant A, a second quadrant B, a third quadrant C, and a fourth quadrant D.

The electrode portions 64 are disposed on the first quadrant A, the second quadrant B, the third quadrant C, and the fourth quadrant D.

As shown in FIG. 15, in a state where decentering does not occur in the light transmission path 52 (see FIGS. 4A to 4C), the areas of the first liquid 14 located on the electrode portions 64 are equal to each other, and the areas of the second liquid 16 located on the electrode portions 64 are equal to each other. That is, the lengths of the interface 48*b*1 between the first liquid 14 and the second liquid 16 located on the electrode portions 64 are equal to each other.

In contrast, as shown in FIGS. 16 and 17, for example, when the second liquid 16 moves in the direction of the second quadrant B and decentering occurs in the light transmission path 52, the length of the interface 48*b*1 located on the electrode portion 64 of the second quadrant B is not equal to the length of the interface 48*b*1 located on the electrode portion 64 of the fourth quadrant D.

More specifically, the length of the interface 48*b*1 located on the electrode portion 64 of the second quadrant B is longer than the length of the interface 48*b*1 located on the electrode portion 64 of the fourth quadrant D.

The reason for this is as follows. Each of the electrode portions 64 and each of the first non-electrode portions 66 have a width in the circumferential direction of the virtual axis 38. Each of the electrode portions 64 is formed so that the width thereof diverges toward the outside in the radial direction of a circle, the center of which is the virtual axis 38. Each of the first non-electrode portions 66 is formed so that the width thereof tapers toward the outside in the radial direction of the circle.

Accordingly, when the voltage applied to each of the electrode portions 64 is uniform (when the electric potential is uniform), a force per unit length with which the first liquid 14 pushes the second liquid 16 is uniform in each of the quadrants. However, since the length of the interface 48*b*1 located on the electrode portion 64 in the second quadrant B is long, the force for pushing the second liquid 16 increases in proportion to the length of the interface 48*b*1. Consequently, the force for pushing the second liquid 16 in the second quadrant B acts stronger than that in the fourth quadrant D.

Therefore, since the length of the interface 48*b*1 located on the electrode portion 64 of the second quadrant B is longer than the length of the interface 48*b*1 located on the electrode portion 64 of the fourth quadrant D, the force with which the first liquid 14 located on the second quadrant B pushes the second liquid 16 becomes larger than the force with which the first liquid 14 located on the fourth quadrant D pushes the second liquid 16.

As a result, the second liquid 16 is pushed back to a position where a force with which the second liquid 16 is pushed by the first liquid 14 is balanced. That is, as shown in FIG. 15, the second liquid 16 is pushed back to a position at which the length of the interface 48*b*1 in the second quadrant B is equal to the length of the interface 48*b*1 in the fourth quadrant D. As a result, the position of the center of the second liquid 16 corresponds to the virtual axis 38. The shape of the interface 48 between the first liquid 14 and the second liquid 16 is stabilized at this position, and thus, decentering of the light transmission path 52 is prevented.

As shown in FIG. 13, four arms composed of the second liquid 16 project from the outer circumference of a portion of the second liquid 16 located on the second non-electrode portion 68 to the outside in the radial direction of the second non-electrode portion 68 along each of the first non-electrode portions 66. In other words, the second liquid 16 collected on the first non-electrode portions 66 forms the four arms.

Therefore, the outer circumference of the central portion (the portion located on the second electrode opening 42) of the second liquid 16 is in a state of being pulled by the four arm portions. Thereby, the central portion of the second liquid 16 is constantly urged so as to correspond to the virtual axis 38.

Accordingly, as shown in FIG. 17, when the second liquid 16 moves in the direction of the second quadrant B and the central portion of the second liquid 16 is decentered from the virtual axis 38, the balance between the forces generated by the four arm portions and acting on the central portion of the second liquid 16 is disrupted, and the forces generated by the four arm portions act in a direction in which the center of the second liquid 16 corresponds to the virtual axis 38.

By this operation, the second liquid 16 is more reliably recovered to a position at which the center of the second liquid 16 corresponds to the virtual axis 38. The shape of the interface 48 between the first liquid 14 and the second liquid 16 is further stabilized at this position, and thus, decentering of the light transmission path 52 can be prevented more effectively.

The above-described operation of the four arm portions to control the central portion of the second liquid 16 can be described, for example, as follows.

Specifically, when a drumskin is fixed on a barrel of a drum with tension, the center of the drumskin is made to correspond to the central axis of the barrel.

In this case, several points of the drumskin located in the circumferential direction of the central axis of the barrel are tentatively fixed, and the several points of the drumskin are then pulled toward the outside of the barrel little by little. Thereby, the center of the drumskin can be easily made to correspond to the central axis of the barrel.

Similarly, forces oriented toward the outside in the radial direction act on the second liquid 16 by means of the four arm portions, and thus, the center of the second liquid 16 can be easily made to correspond to the virtual axis 38.

In addition, when the voltage applied between the first electrode 18 and the second electrode 20 is increased or decreased in a state where the second liquid 16 is collected on each of the first non-electrode portions 66, the second liquid 16 moves along the four arm portions. Accordingly, this structure is advantageous in that the second liquid 16 is moved uniformly and smoothly in the circumferential direction of a circle, the center of which is the virtual axis 38.

As described above, according to the third embodiment, in addition to the same advantage as the first embodiment, the following advantage can be achieved.

Each of the electrode portions 64 and each of the first non-electrode portions 66 of the optical element 10 have a width in the circumference direction of the virtual axis 38. Each of the electrode portions 64 is formed so that the width of the electrode portion 64 diverges toward the outside in the radial direction of a circle, the center of which is the virtual axis 38. Each of the first non-electrode portions 66 is formed so that the width of the first non-electrode portion 66 tapers toward the outside in the radial direction. Accordingly, although the same voltage is applied to each of the electrode portions 64, the shape of the interface 48 between the first liquid 14 and the second liquid 16 is stabilized at a position at which the center of the second liquid 16 corresponds to the virtual axis 38. Therefore, decentering of the light transmission path 52 (aperture 52A) is prevented.

Accordingly, this structure is advantageous in that a decrease in the optical property caused by aberration due to decentering of the light transmission path 52 of the optical element 10 or generation of shading due to nonuniformity of the amount of ambient light is prevented.

Fourth Embodiment

A fourth embodiment differs from the third embodiment in that a second electrode 20 includes three electrode portions 64 and the number of the first non-electrode portions 66 is three.

Figure 18:
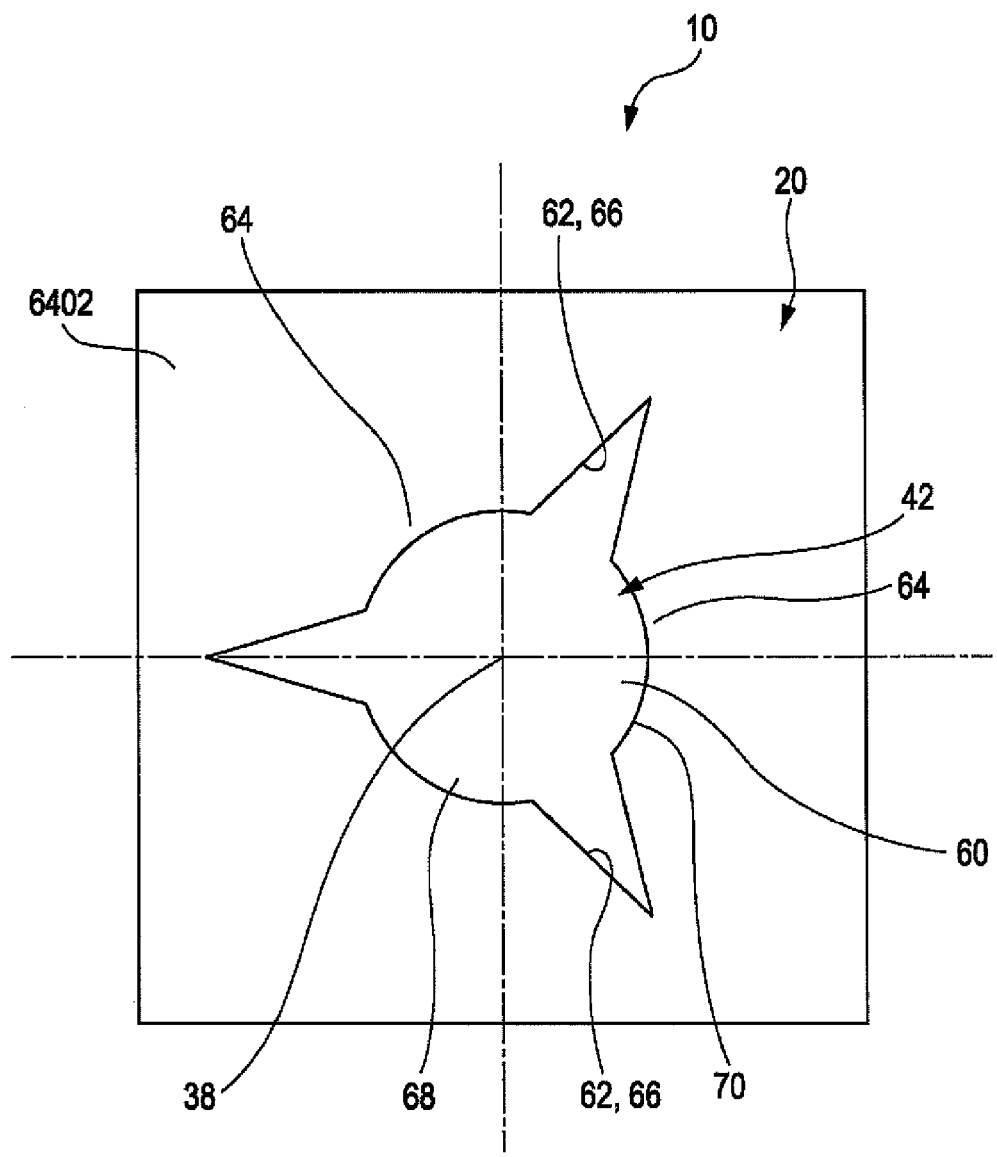
FIG. 18 is a plan view of a second electrode 20 of an optical element 10 according to a fourth embodiment.

Specifically, as shown in FIG. 18, the second electrode 20 is composed of the three electrode portions 64 having the same shape and the same size, and portions 6402 disposed outside of the electrode portions 64 are connected to each other.

First non-electrode portions 66 (projecting portions 62) in which the electrode portions 64 are not formed are provided between electrode portions 64 adjacent in the circumferential direction of the virtual axis 38.

In this embodiment, three first non-electrode portions 66 having the same shape and the same size are provided.

The structure of the fourth embodiment is the same as the third embodiment except that the second electrode 20 includes three electrode portions 64 and the number of the first non-electrode portions 66 is three.

The fourth embodiment having the above structure can also achieve the same advantages as the third embodiment.

Fifth Embodiment

Next, a fifth embodiment will be described.

Figure 19:
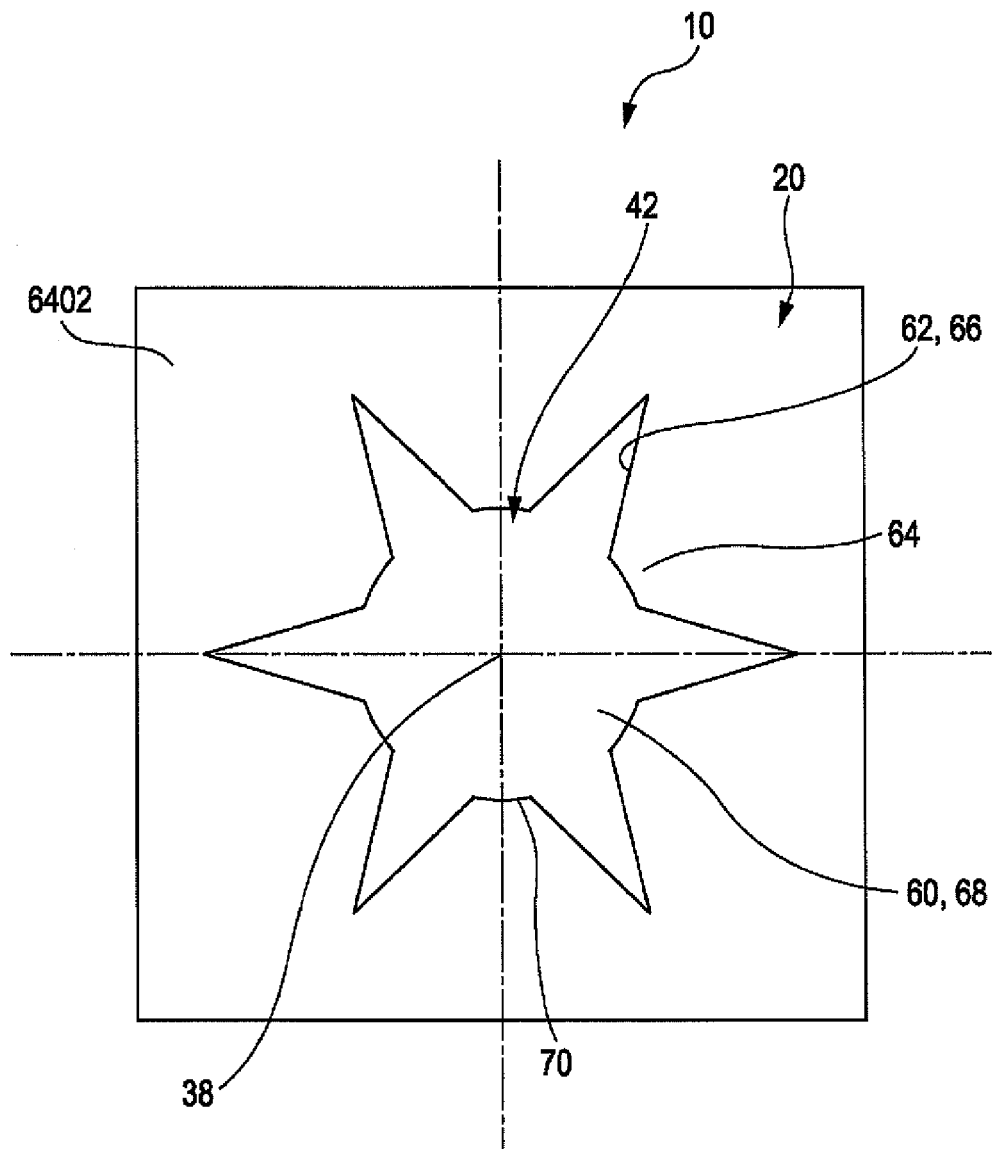
FIG. 19 is a plan view of a second electrode 20 of an optical element 10 according to a fifth embodiment.

FIG. 19 is a plan view of a second electrode 20 of an optical element 10 according to the fifth embodiment.

The fifth embodiment differs from the third embodiment in that the second electrode 20 includes six electrode portions 64 and the number of the first non-electrode portions 66 (projecting portions 62) is six.

Specifically, as shown in FIG. 19, the second electrode 20 is composed of the six electrode portions 64 having the same shape and the same size, and portions 6402 disposed at the outside of the electrode portions 64 are connected to each other.

First non-electrode portions 66 (projecting portions 62) in which the electrode portions 64 are not formed are provided between electrode portions 64 adjacent in the circumferential direction of the virtual axis 38.

In this embodiment, six first non-electrode portions 66 having the same shape and the same size are provided.

The structure of the fifth embodiment is the same as the third embodiment except that the second electrode 20 includes six electrode portions 64 and the number of the first non-electrode portions 66 (projecting portions 62) is six.

The fifth embodiment having the above structure can also achieve the same advantages as the third embodiment.

In the fifth embodiment, the number of the electrode portions 64 and the number of the first non-electrode portions 66 (projecting portions 62) are larger than those in the third embodiment. Therefore, the degree of nonuniformity of the force of an electric field applied to the first liquid 14 in the circumferential direction of a circle, the center of which is the virtual axis 38, can be further reduced. Accordingly, the interface 48 between the first liquid 14 and the second liquid 16 also becomes uniform in the circumferential direction. Accordingly, this structure is advantageous in that the shape of the light transmission path 52 (aperture 52A) of the optical element 10 is closer to a circle.

Sixth Embodiment

Next, a sixth embodiment will be described.

Figure 20:
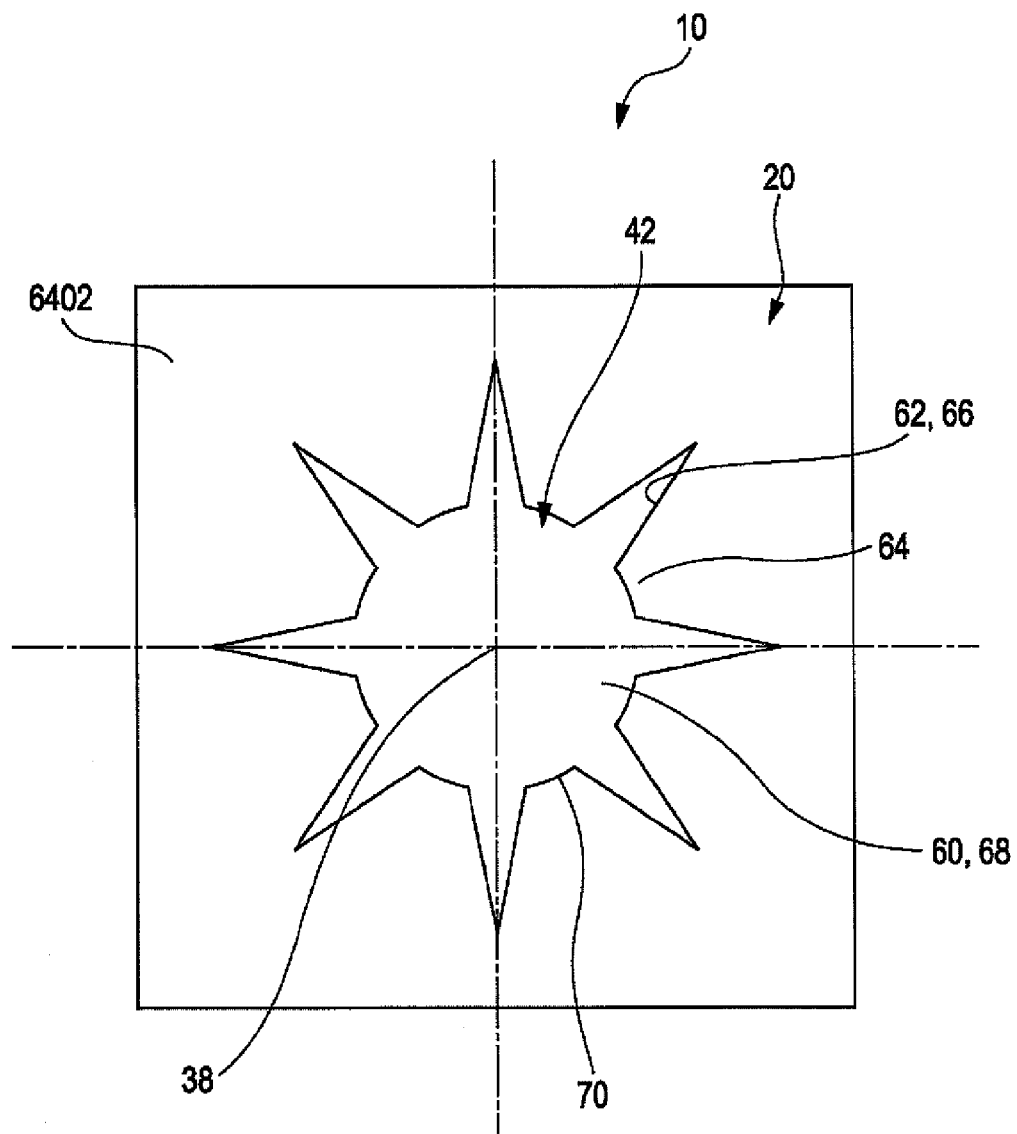
FIG. 20 is a plan view of a second electrode 20 of an optical element 10 according to a sixth embodiment.

FIG. 20 is a plan view of a second electrode 20 of an optical element 10 according to the sixth embodiment.

The sixth embodiment differs from the third embodiment in that the second electrode 20 includes eight electrode portions 64 and the number of the first non-electrode portions 66 (projecting portions 62) is eight.

Specifically, as shown in FIG. 20, the second electrode 20 is composed of the eight electrode portions 64 having the same shape and the same size, and portions 6402 disposed outside of the electrode portions 64 are connected to each other.

First non-electrode portions 66 (projecting portions 62) in which the electrode portions 64 are not formed are provided between electrode portions 64 adjacent in the circumferential direction of the virtual axis 38.

In this embodiment, eight first non-electrode portions 66 (projecting portions 62) having the same shape and the same size are provided.

The structure of the sixth embodiment is the same as the third embodiment except that the second electrode 20 includes eight electrode portions 64 and the number of the first non-electrode portions 66 (projecting portions 62) is eight.

The sixth embodiment having the above structure can also achieve the same advantages as the third embodiment.

In the sixth embodiment, the number of the electrode portions 64 and the number of the first non-electrode portions 66 (projecting portions 62) are larger than those in the third embodiment. Therefore, the degree of nonuniformity of the force of an electric field applied to the first liquid 14 in the circumferential direction of a circle, the center of which is the virtual axis 38, can become further reduced. Accordingly, the interface 48 between the first liquid 14 and the second liquid 16 also becomes uniform in the circumferential direction. Accordingly, this structure is advantageous in that the shape of the light transmission path 52 (aperture 52A) of the optical element 10 is closer to a circle.

Seventh Embodiment

Next, a seventh embodiment will be described.

Figure 21:
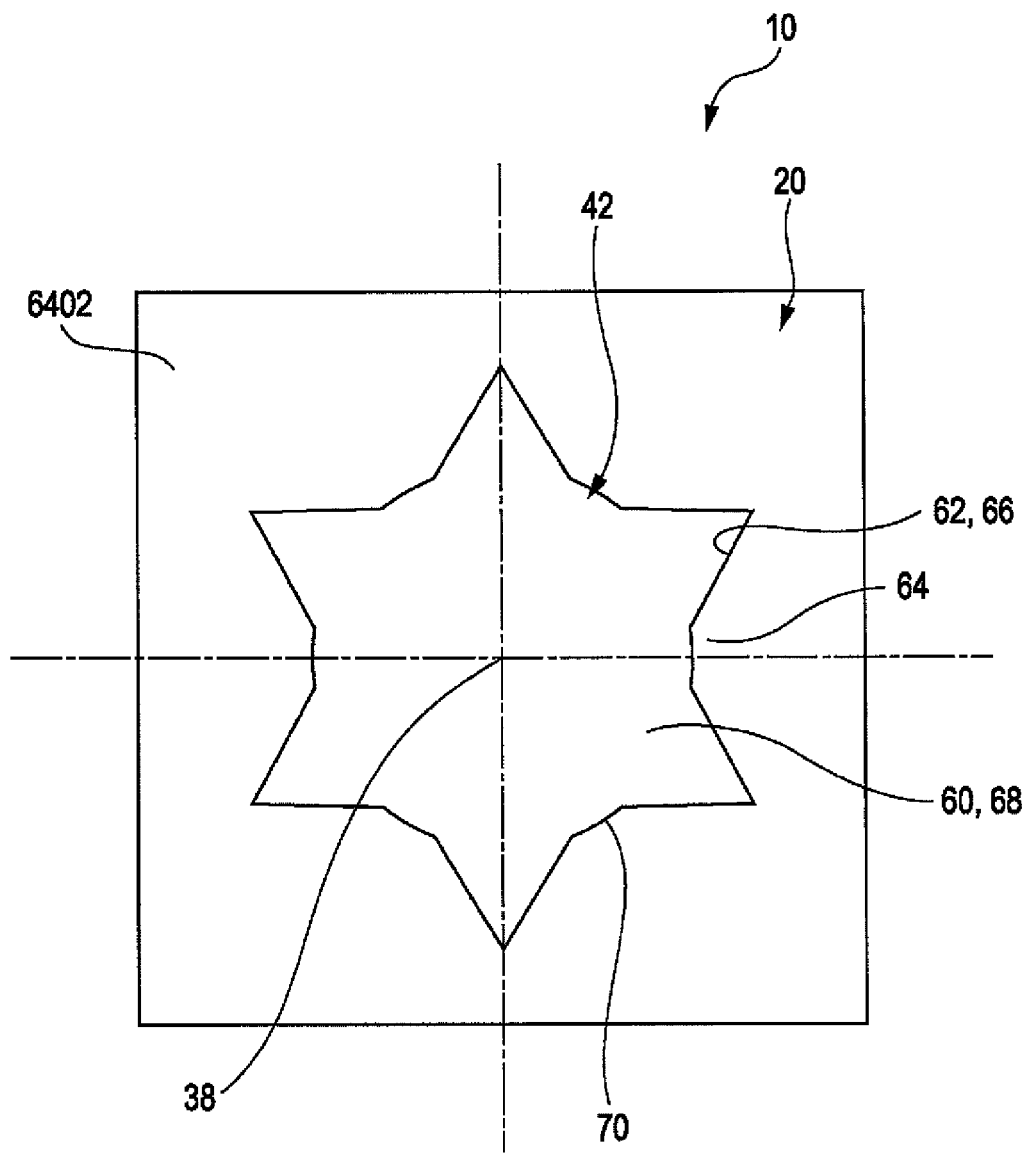
FIG. 21 is a plan view of a second electrode 20 of an optical element 10 according to a seventh embodiment.

FIG. 21 is a plan view of a second electrode 20 of an optical element 10 according to the seventh embodiment.

In the seventh embodiment, the shape of each of the electrode portions 64 constituting the second electrode 20 and the shape of each of the first non-electrode portions 66 (projecting portions 62) are different from those in the fifth embodiment.

Specifically, as shown in FIG. 19, the shape of each of the first non-electrode portions 66 (projecting portions 62) in the fifth embodiment is an isosceles triangle, whereas that in the seventh embodiment is a substantially equilateral triangle.

In accordance with the shape of each of the first non-electrode portions 66, the shape of each of the electrode portions 64 located between adjacent first non-electrode portions 66 (projecting portions 62), i.e., the fan shape forming each of the electrode portions 64 is also different from that in the fifth embodiment.

The structure of the seventh embodiment is the same as the fifth embodiment except for the shape of each of the electrode portions 64 constituting the second electrode 20 and the shape of each of the first non-electrode portions 66 (projecting portions 62).

The seventh embodiment having the above structure can also achieve the same advantages as the fifth embodiment.

Eighth Embodiment

Next, an eighth embodiment will be described.

Figure 22:
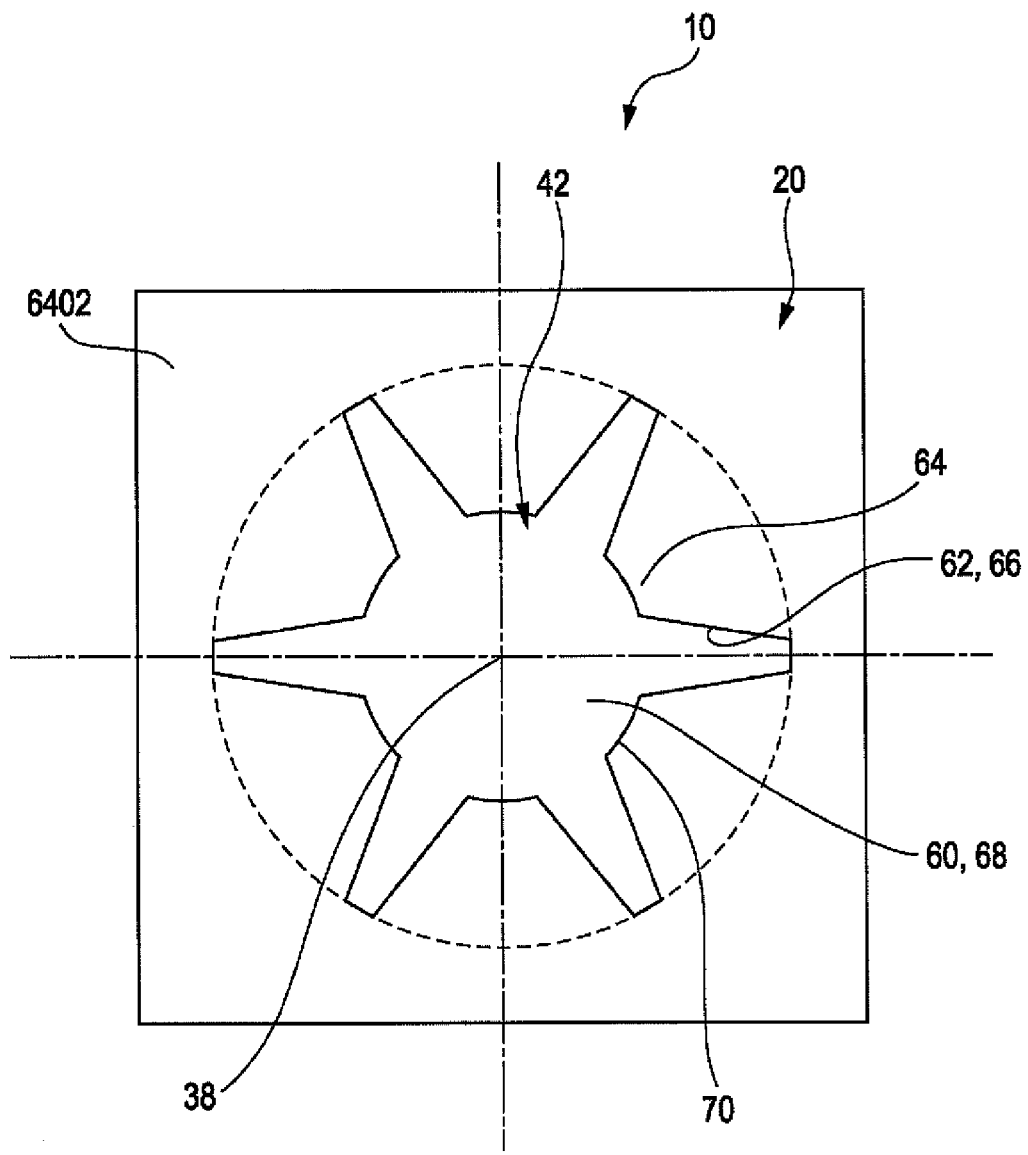
FIG. 22 is a plan view of a second electrode 20 of an optical element 10 according to an eighth embodiment.

FIG. 22 is a plan view of a second electrode 20 of an optical element 10 according to the eighth embodiment.

In the eight embodiment, the shape of an leading end (an end located at the outside in the radial direction of a circle, the center of which is the virtual axis 38) of each of first non-electrode portions 66 (projecting portions 62), is different from that in the fifth embodiment.

Specifically, as shown in FIG. 22, the leading end of each of the electrode portions 64 has an arcuate shape so as to be arranged on a circumference of a single circle, the center of which is the virtual axis 38.

The structure of the eighth embodiment is the same as the fifth embodiment except for the shape of the leading end of each of the electrode portions 64.

The eighth embodiment having the above structure can also achieve the same advantages as the fifth embodiment.

Ninth Embodiment

Next, a ninth embodiment will be described.

Figure 23:
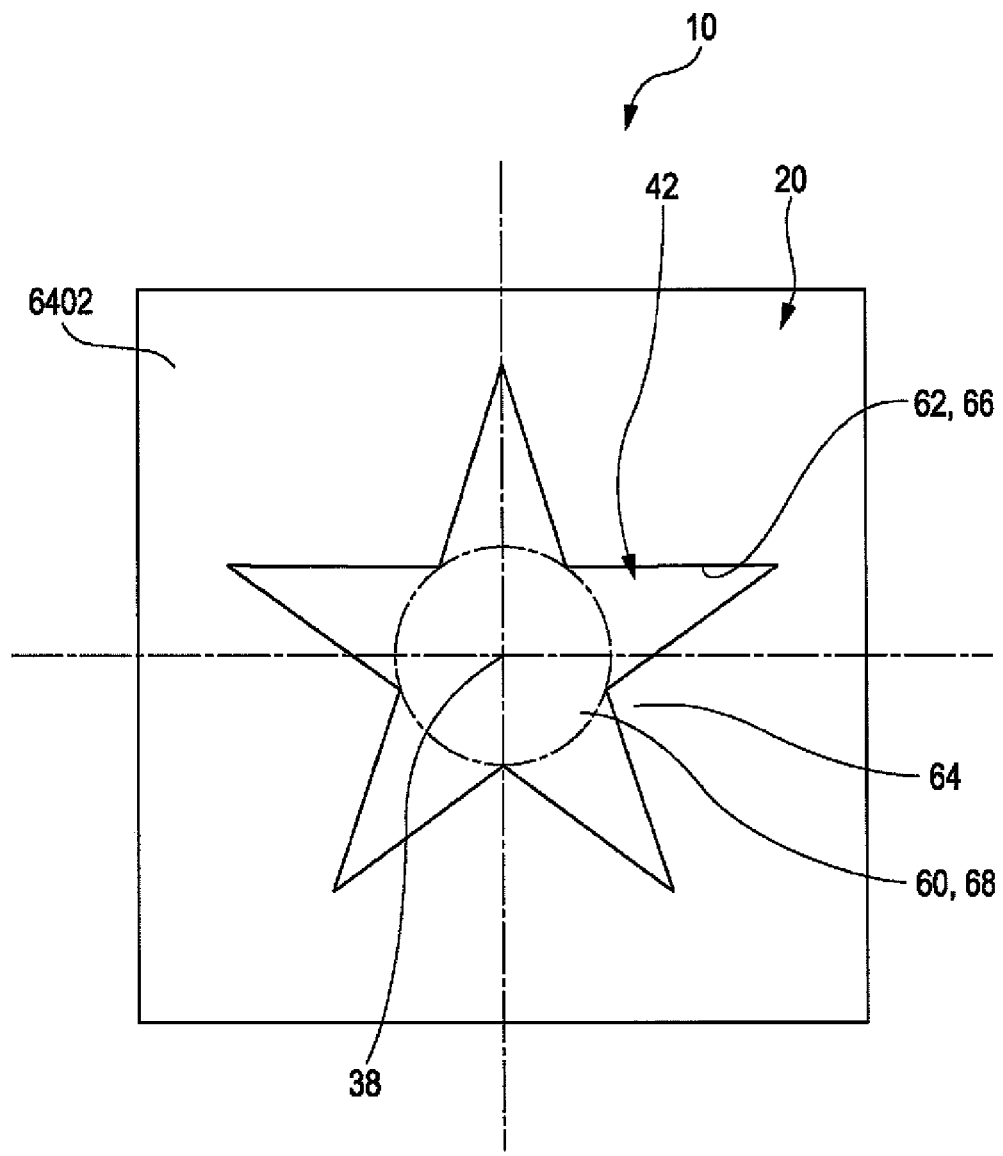
FIG. 23 is a plan view of a second electrode 20 of an optical element 10 according to a ninth embodiment.

FIG. 23 is a plan view of a second electrode 20 of an optical element 10 according to the ninth embodiment.

The ninth embodiment differs from the third embodiment in that first non-electrode portions 66 (projecting portions 62) are provided so as to be continuous to the outer circumference of a second non-electrode portion 68.

More specifically, in the ninth embodiment, the circular-arc portion 70 (see FIG. 10) is not provided at the boundary between the inner circumference of each of the electrode portions 64 and the outer circumference of the second non-electrode portion 68, and the first non-electrode portions 66 (projecting portions 62) are provided so as to be continuous to the outer circumference of the second non-electrode portion 68. Accordingly, the inner portion of each of the electrode portions 64 is arranged so as to have an angle projecting toward the virtual axis 38.

Furthermore, the ninth embodiment differs from the third embodiment in that the second electrode 20 includes five electrode portions 64, and the number of the first non-electrode portions 66 (projecting portions 62) is five.

Other structures of the ninth embodiment are the same as the third embodiment.

The ninth embodiment having the above structure can also achieve the same advantages as the third embodiment.

Tenth Embodiment

Next, a tenth embodiment will be described.

Figure 24:
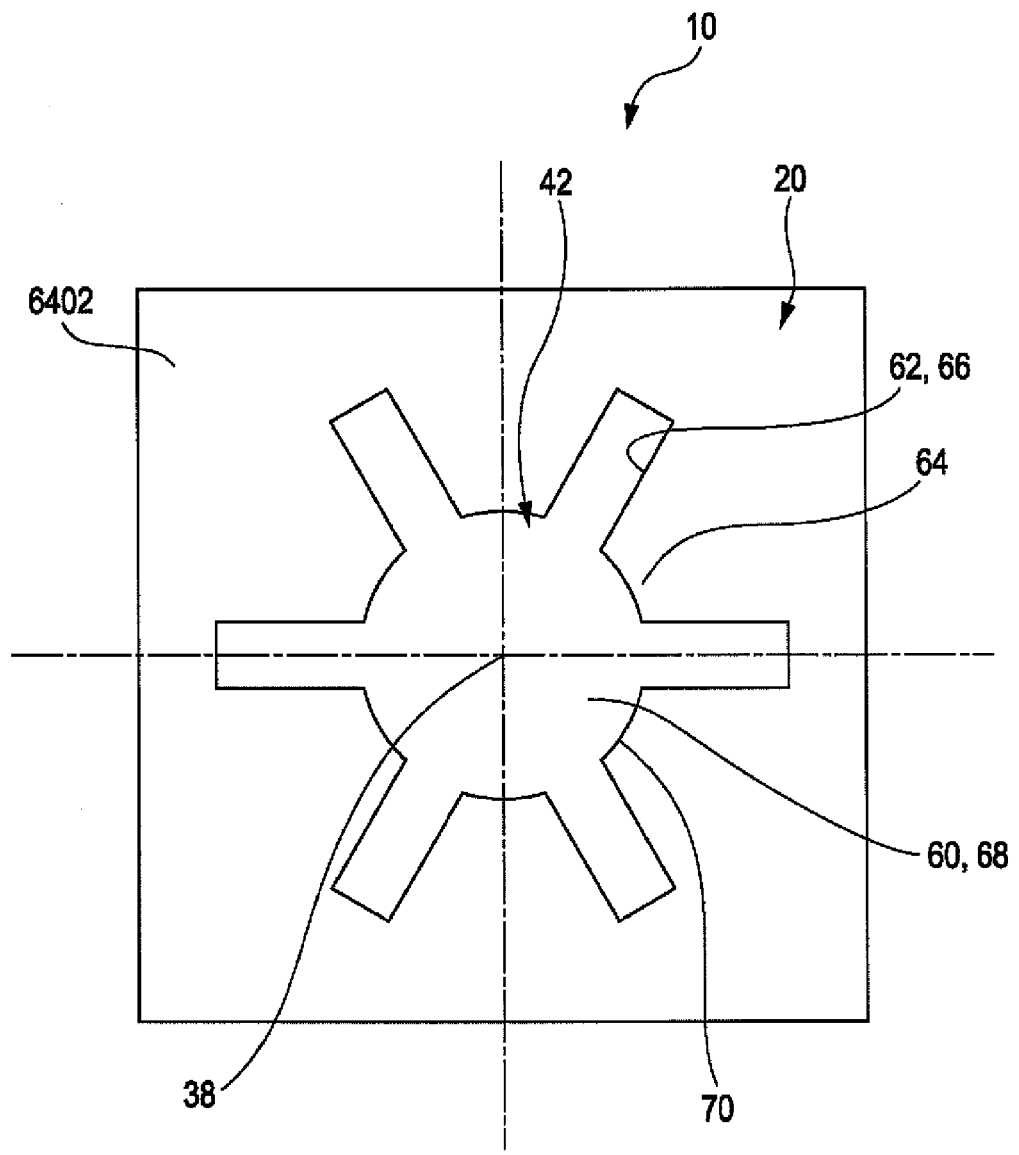
FIG. 24 is a plan view of a second electrode 20 of an optical element 10 according to a tenth embodiment.

FIG. 24 is a plan view of a second electrode 20 of an optical element 10 according to the tenth embodiment.

As shown in FIG. 24, a second electrode opening 42 is composed of a circular portion 60, the canter of which is the virtual axis 38, and a plurality of projecting portions 62 projecting from portions disposed on the outer circumference of the circular portion 60 at intervals in the circumferential direction toward the outside in the radial direction.

Each of the projecting portions 62 has a uniform width in a direction orthogonal to the direction in which the projecting portions 62 project.

That is, the second electrode 20 is composed of a plurality of electrode portions 64 which extend in the radial direction and the center of which is a single virtual axis 38 extending in the thickness direction of a container 12.

In this embodiment, the second electrode 20 is composed of six electrode portions 64 having the same shape and the same size, and portions 6402 disposed outside of the electrode portions 64 are connected to each other. Accordingly, a voltage is uniformly applied throughout the second electrode 20 by the voltage applying unit 22, that is, the same voltage is applied to each of the electrode portions 64.

First non-electrode portions 66 (projecting portions 62) in which the electrode portions 64 are not formed are provided between electrode portions 64 adjacent in the circumferential direction of the virtual axis 38.

In this embodiment, six first-electrode portions 66 (projecting portions 62) having the same shape and the same size are provided.

Each of the electrode portions 64 and each of the first non-electrode portions 66 (projecting portions 62) have a width in the circumferential direction of the virtual axis 38. Each of the electrode portions 64 is formed so that the width of the electrode portion 64 diverges toward the outside in the radial direction of the circle, the center of which is the virtual axis 38. Each of the first non-electrode portions 66 (projecting portions 62) has a uniform width in the radial direction.

In addition, on a single circumference, the center of which is the virtual axis 38, the width of each of the electrode portions 64 is larger than the width of the first non-electrode portion 66 (projecting portion 62).

In this embodiment, each of the electrode portions 64 extends in the form of a fan shape to the outside in the radial direction with respect to the virtual axis 38 functioning as the center. The end of each of the first non-electrode portions 66 (projecting portions 62) is located on a single virtual circle, the center of which is the virtual axis 38.

Furthermore, in this embodiment, a second non-electrode portion 68 in which the electrode portions 64 are not formed is provided in a substantially circular area, the center of which is the virtual axis 38.

Each of the electrode portions 64 is provided outside in the radial direction of the second non-electrode portion 68. The inner peripheral portion of the radial direction of each of the electrode portions 64 extends on a single virtual circle, the center of which is the virtual axis 38.

Each of the first non-electrode portions 66 (projecting portions 62) is provided so as to project from a portion disposed on the outer circumference of the second non-electrode portion 68 at intervals in the circumferential direction toward the outside in the radial direction of the second non-electrode portion 68. Each of the first non-electrode portions 66 (projecting portions 62) is connected to the outer circumference of the second non-electrode portion 68.

Accordingly, a circular-arc portion 70 is formed at the boundary between the inner circumference of each of the electrode portions 64 and the outer circumference of the second non-electrode portion 68.

The tenth embodiment having the above structure can also achieve the same advantages as the third embodiment.

Eleventh Embodiment

Next, an eleventh embodiment will be described.

Figure 25:
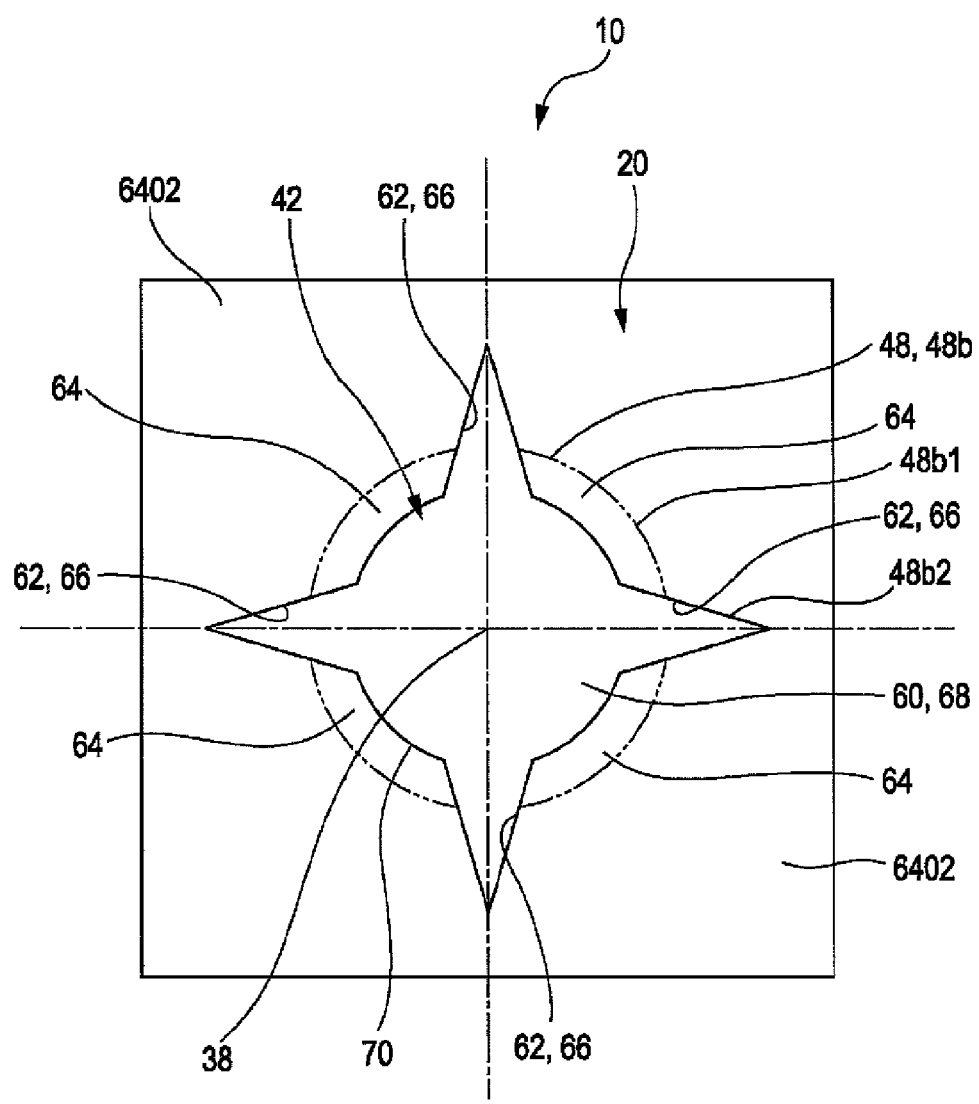
FIG. 25 is a plan view of a second electrode 20 of an optical element 10 according to an eleventh embodiment.

FIG. 25 is a plan view of a second electrode 20 of an optical element 10 according to the eleventh embodiment.

The eleventh embodiment is a modification of the second embodiment. In this embodiment, an optical element 10 constitutes a lens.

The structure of the optical element 10 of the eleventh embodiment is substantially the same as the third embodiment except that the compositions of a first liquid 14 and a second liquid 16 of the eleventh embodiment are different from the first liquid 14 and the second liquid 16 of the third embodiment. Therefore, structures different from the third embodiment will be described below.

In the optical element 10, the shape of the interface 48 between the first liquid 14 and the second liquid 16 is changed to a curved surface by applying a voltage with a voltage applying unit 22. Consequently, light traveling in the thickness direction of a container 12, which is a direction in which a first end face wall 24 and a second end face wall 26 face each other, and passing through the interface 48 is refracted.

As in the third embodiment, the optical element 10 includes the container 12, the first liquid 14, the second liquid 16, a first electrode 18, a second electrode 20, and the voltage applying unit 22.

The first liquid 14 has polarity or electrical conductivity and is enclosed in an accommodating chamber 30.

The second liquid 16 is immiscible with the first liquid 14 and is enclosed in the accommodating chamber 30.

The first liquid 14 and the second liquid 16 are transparent and have specific gravities substantially the same as each other.

The refractive index of the second liquid 16 is different from the refractive index of the first liquid 14. In this embodiment, the optical element 10 is configured so that the refractive index of the second liquid 16 is higher than the refractive index of the first liquid 14.

Alternatively, the optical element 10 of this embodiment is configured so that the Abbe number of the second liquid 16 is different from the Abbe number of the first liquid 14.

Alternatively, the optical element 10 of this embodiment is configured so that the refractive index of the second liquid 16 is different from the refractive index of the first liquid 14, and in addition, the Abbe number of the second liquid 16 is different from the Abbe number of the first liquid 14.

The shape and the arrangement of the first electrode 18 and the second electrode 20 are the same as those in the third embodiment.

As shown in FIG. 25, a second electrode opening 42 includes a circular portion 60, the center of which is a virtual axis 38, and a plurality of projecting portions 62 projecting from portions disposed on the outer circumference of the circular portion 60 at intervals in the circumferential direction toward the outside in the radial direction.

Each of the projecting portions 62 has a width in a direction orthogonal to the direction in which the projecting portions 62 project and is configured so that the width tapers as the projecting portions 62 extend toward the outside in the radial direction.

That is, the second electrode 20 is composed of a plurality of electrode portions 64 which extend in the radial direction and the center of which is a single virtual axis 38 extending in the thickness direction of the container 12.

First non-electrode portions 66 (projecting portions 62) in which the electrode portions 64 are not formed are provided between electrode portions 64 adjacent in the circumferential direction of the virtual axis 38.

In this embodiment, four first non-electrode portions 66 (projecting portions 62) having the same shape and the same size are provided.

Each of the electrode portions 64 and each of the first non-electrode portions 66 (projecting portions 62) have a width in the circumferential direction of the virtual axis 38. Each of the electrode portions 64 is formed so that the width of the electrode portion 64 diverges toward the outside in the radial direction of a circle, the center of which is the virtual axis 38. Each of the first non-electrode portions 66 (projecting portions 62) is formed so that the width of the first non-electrode portion 66 (projecting portion 62) tapers toward the outside in the radial direction.

In addition, on a single circumference, the center of which is the virtual axis 38, the width of each of the electrode portions 64 is larger than the width of the first non-electrode portion 66 (projecting portion 62).

In this embodiment, each of the electrode portions 64 extends in the form of a fan shape to the outside in the radial direction with respect to the virtual axis 38 functioning as the center. Each of the first non-electrode portions 66 (projecting portions 62) extends in the form of an isosceles triangle so that the width of the first non-electrode portion 66 (projecting portion 62) tapers toward the outside in the radial direction. The end of each of the first non-electrode portions 66 (projecting portions 62) is located on a single virtual circle, the center of which is the virtual axis 38.

In this embodiment, a second non-electrode portion 68 in which the electrode portions 64 are not formed is located in a substantially circular area, the center of which is the virtual axis 38.

Each of the electrode portions 64 is provided outside in the radial direction of the second non-electrode portion 68. The inner peripheral portion of the radial direction of each of the electrode portions 64 extends on a single virtual circle, the center of which is the virtual axis 38.

The first non-electrode portions 66 (projecting portions 62) are provided so as to project from portions disposed on the outer circumference of the second non-electrode portion 68 at intervals in the circumferential direction toward the outside in the radial direction of the second non-electrode portion 68. Each of the first non-electrode portions 66 (projecting portions 62) is connected to the outer circumference of the second non-electrode portion 68.

Accordingly, a circular-arc portion 70 is formed at the boundary between the inner circumference of each of the electrode portions 64 and the outer circumference of the second non-electrode portion 68.

As in FIG. 11 showing the third embodiment, the two-dot chain line in FIG. 25 indicates an interface 48 (48$b$, 48$b$1, and 48$b$2) on the second end face wall 26.

Next, the operation of the optical element 10 will be described with reference to FIG. 7 and FIGS. 8A, 8B, and 8C again.

As shown in FIG. 7, in a state in which no voltage V is applied from the voltage applying unit 22 to the first electrode 18 and the second electrode 20, the shape of the interface 48 between the first liquid 14 and the second liquid 16 is determined by a balance between surface tensions of the first liquid 14 and the second liquid 16 and interfacial tension on the water-repellent film 36. In this state, the interface 48 forms a gradual convex surface projecting from the second liquid 16 toward the first liquid 14.

Here, since the refractive index of the second liquid 16 is higher than the refractive index of the first liquid 14, light passing through the first end face wall 24 and the second end face wall 26, traveling in the thickness direction of the container 12, and passing through the interface 48 is refracted at the interface 48. Accordingly, the optical element 10 constitutes a lens having a power for converging light.

Next, as shown in FIG. 8A, when a voltage V1 (>0) is applied from the voltage applying unit 22 to the first electrode 18 and the second electrode 20, the slope of the curvature of the convex surface (spherical surface) of the interface 48 is increased by electrocapillarity.

Next, as shown in FIG. 8B, when a voltage V2 (>V1) is applied from the voltage applying unit 22 to the first electrode 18 and the second electrode 20, the slope of the curvature of the convex surface (spherical surface) of the interface 48 is further increased.

Next, as shown in FIG. 8C, when a voltage V3 (>V2) is applied from the voltage applying unit 22 to the first electrode 18 and the second electrode 20, the slope of the curvature of the convex surface (spherical surface) of the interface 48 is further increased.

Accordingly, by adjusting the voltage applied from the voltage applying unit 22 to the first electrode 18 and the second electrode 20, the curvature of the interface 48 is changed, and thus the focal length of the lens can be changed (the power of the lens can be changed).

As described above, as in the second embodiment, the optical element 10 constituting a lens can be used in an imaging optical system of an image-pickup apparatus such as a digital still camera, a video camera, or the like.

As described above, according to the eleventh embodiment, in addition to the same advantage as the second embodiment, the following advantage can be achieved.

In the optical element 10, by increasing or decreasing the voltage applied between the first electrode 18 and the second electrode 20 in the range of V1 to V3, the shape of the interface 48 is changed and the focal length of the lens is changed. In this case, regardless of the change in the voltage applied between the first electrode 18 and the second electrode 20, the center of the lens constantly corresponds to the virtual axis 38. Even if the center of the lens deviates from the virtual axis 38 and decentering occurs, the position the center of the lens is automatically recovered so as to correspond to the position of the virtual axis 38.

Specifically, as in the third embodiment, each of the electrode portions 64 and each of the first non-electrode portions 66 (projecting portions 62) of the optical element 10 have a width in the circumference direction of the virtual axis 38. Each of the electrode portions 64 is formed so that the width of the electrode portion 64 diverges toward the outside in the radial direction of a circle, the center of which is the virtual axis 38. Each of the first non-electrode portions 66 (projecting portions 62) is formed so that the width of the first non-electrode portion 66 (projecting portion 62) tapers toward the outside in the radial direction. Accordingly, although the same voltage is applied to each of the electrode portions 64, the shape of the interface 48 between the first liquid 14 and the second liquid 16 is stabilized at a position at which the center of the second liquid 16 corresponds to the virtual axis 38. Therefore, decentering of the lens is prevented.

Furthermore, as in the third embodiment, four arms composed of the second liquid 16 project from the outer circumference of a portion of the second liquid 16 located on the second non-electrode portion 68 to the outside in the radial direction of the second non-electrode portion 68 along each of the first non-electrode portions 66 (projecting portions 62). Therefore, the outer circumference of the central portion (the portion located on the second electrode opening 42) of the second liquid 16 is in a state of being pulled by the four arm portions. Thereby, the central portion of the second liquid 16 is constantly urged so as to correspond to the virtual axis 38. Accordingly, a force acting on the central portion of the second liquid 16 and generated by the four arm portions acts in a direction in which the center of the second liquid 16 corresponds to the virtual axis 38.

By this operation, the second liquid 16 is more reliably recovered to a position at which the center of the second liquid 16 corresponds to the virtual axis 38. The shape of the interface 48 between the first liquid 14 and the second liquid 16 is further stabilized at this position, and thus, decentering of the lens can be prevented more effectively.

In the eleventh embodiment, a description has been made of a case where the second electrode 20 of the optical element 10 has the same structure as that in the third embodiment. Alternatively, the second electrode 20 may have the same structure as that in the fourth embodiment to the tenth embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An optical element comprising:
a container including a first end face wall and a second end face wall facing each other, a side face wall connecting the first end face wall to the second end face wall, and a hermetically sealed accommodating chamber provided inside the end face walls and the side face wall;
a first transparent liquid having polarity or electrical conductivity and enclosed in the accommodating chamber;
a second transparent liquid immiscible with the first liquid and enclosed in the accommodating chamber;
a first electrode and a second electrode configured to apply an electric field to the first liquid;
an insulating film;
a film whose wettability to the second liquid is higher than the wettability to the first liquid; and
a unit configured to apply a voltage between the first electrode and the second electrode,
wherein a shape of an interface between the first liquid and the second liquid is changed by applying the voltage with the unit configured to apply the voltage to form the interface having a curved surface, a center of which is a single virtual axis passing through the first end face wall and the second end face wall and extending in a thickness direction of the container, which is a direction in which the first end face wall and the second end face wall face each other, thereby refracting light traveling in a direction of the virtual axis and passing through the interface,
the first electrode is provided on an inner surface of the first end face wall, the inner surface facing the accommodating chamber,
the second electrode is provided on an inner surface of the second end face wall, the inner surface facing the accommodating chamber,
the insulating film is provided on a surface of the second electrode, the surface facing the accommodating chamber,
the film whose wettability to the second liquid is higher than its wettability to the first liquid is provided on a surface of the insulating film, the surface facing the accommodating chamber, and
when viewed from the thickness direction of the container, an opening having a diameter the same as or smaller than a maximum diameter of the interface, the center of which is the virtual axis, is provided in the film provided on the surface of the insulating film.

2. An optical element comprising:
a container including a first end face wall and a second end face wall facing each other, and forming a chamber provided between the first end face wall and the second end face wall;
a first liquid enclosed in the chamber;
a second liquid immiscible with the first liquid and enclosed in the chamber;
a first electrode;
a second electrode;
an insulating film; and
a film whose wettability to the second liquid is higher than the wettability to the first liquid;
wherein, the shape of an interface between the first liquid and the second liquid is changed by the application of the voltage between the first electrode and the second electrode, and a light transmission path, the center of which is a single virtual axis passing through the first end face wall and the second end face wall, is formed in a portion of the second liquid,
the second electrode is provided at an inner surface of the second end face wall, the inner surface facing the chamber,
the insulating film being provided on a surface of the second electrode, the surface facing the chamber,
the film whose wettability to the second liquid is higher than the wettability to the first liquid is provided on surface of the insulating film, the surface facing the chamber, and
when viewed along the virtual axis, an opening having a diameter the same as or smaller than the maximum diameter of the transmission path, the center of which is the virtual axis, is provided in the film whose wettability to the second liquid is higher than the wettability of the first liquid.

3. An optical element comprising:
a container including a first end face wall and a second end face wall facing each other, and forming a chamber provided between the first end face wall and the second end face wall;
a first liquid enclosed in the chamber;
a second liquid immiscible with the first liquid and enclosed in the chamber;
a first electrode;
a second electrode;
an insulating film; and
a film whose wettability to the second liquid is higher than the wettability to the first liquid;
wherein, the shape of an interface between the first liquid and the second liquid is changed by the application of the voltage between the first electrode and the second electrode, and a light transmission path, the center of which is a single virtual axis passing through the first end face wall and the second end face wall, is formed,
the second electrode is provided at an inner surface of the second end face wall, the inner surface facing the chamber,
the insulating film being provided on a surface of the second electrode, the surface facing the chamber,
the film whose wettability to the second liquid is higher than the wettability to the first liquid is provided on surface of the insulating film, the surface facing the chamber, and
when viewed along the virtual axis, an opening having a diameter the same as or smaller than the maximum diameter of the interface, the center of which is the virtual axis, is provided in the film whose wettability to the second liquid is higher than the wettability to the first liquid.

* * * * *